United States Patent [19]
Guerrera

[11] Patent Number: 5,870,144
[45] Date of Patent: Feb. 9, 1999

[54] REDUCED-QUALITY RESOLUTION DIGITAL VIDEO ENCODER/DECODER

[75] Inventor: Enzo M. Guerrera, San Jose, Calif.

[73] Assignee: Adaptec, Inc., Milpitas, Calif.

[21] Appl. No.: 829,463

[22] Filed: Mar. 28, 1997

[51] Int. Cl.$^6$ .................................................... H04N 7/32
[52] U.S. Cl. ........................... 348/403; 348/408; 348/400
[58] Field of Search ..................... 348/400–407, 348/408, 409, 415–416; 386/109, 111; 382/232, 236, 240; H04N 7/32

[56] References Cited

U.S. PATENT DOCUMENTS

| | | | |
|---|---|---|---|
| 5,046,071 | 9/1991 | Tanoi ........................................ | 348/415 |
| 5,068,726 | 11/1991 | Kondo et al. ........................... | 348/412 |
| 5,140,417 | 8/1992 | Tanaka et al. .......................... | 348/384 |
| 5,193,003 | 3/1993 | Kondo ..................................... | 348/409 |
| 5,253,055 | 10/1993 | Civanlar et al. ....................... | 348/409 |
| 5,262,854 | 11/1993 | Ng ........................................... | 348/416 |
| 5,371,549 | 12/1994 | Park ......................................... | 348/402 |
| 5,374,958 | 12/1994 | Yanagihara ............................ | 348/405 |
| 5,452,104 | 9/1995 | Lee .......................................... | 348/404 |
| 5,511,003 | 4/1996 | Agarwal ................................ | 348/396 |
| 5,543,845 | 8/1996 | Asamura et al. ........................ | 348/407 |
| 5,748,795 | 5/1998 | Ohnishi et al. .......................... | 348/404 |

*Primary Examiner*—Richard Lee
*Assistant Examiner*—Vu Le
*Attorney, Agent, or Firm*—Hickman & Martine, LLP

[57] ABSTRACT

A DV codec process for reduced-quality size decoding of DV encoded video data receives a DV encoded bit stream. Compressed macroblock information and DCT information, including a DC coefficient value, is read for a current DCT block. It is determined whether the current DCT block is a still DCT block. If the current DCT block is a still DCT block, run length decoding is performed to obtain a number of low frequency AC coefficient values for the current still DCT block and a reduced coefficient inverse discrete cosine transform is performed on the low frequency AC coefficient values to yield decoded pixel values for the current still DCT block. If the current DCT block is a motion DCT block, run length decoding is performed to obtain a number of low frequency AC coefficient values for the current motion DCT block and a reduced coefficient inverse discrete cosine transform is performed on the low frequency AC coefficient values to yield decoded pixel values for the current motion DCT block. The codec produces one-quarter size or full-size images.

19 Claims, 15 Drawing Sheets

REDUCED-QUALITY RESOLUTION DIGITAL VIDEO ENCODER/DECODER

FIELD OF THE INVENTION

The present invention pertains to a video encoder/decoder for the Digital Video (DV) standard format. More particularly, the present invention relates to a DV codec for reduced-quality resolution video display.

BACKGROUND OF THE INVENTION

Video data signals may be analog or digital. In analog video standards, e.g., NTSC or PAL for television, video sequences are typically divided into frames and raster lines. With reference to FIG. 1A, an analog video frame 102 is shown to facilitate discussion. The analog video frame 102 includes two interleaved fields; the first field includes a first set of raster lines 104 and the second field includes a second set of raster lines 106. Each field includes half the raster lines 104, 106 of a full frame 102. The frame repetition rate is therefore half the field rate.

The analog video signals shown in FIG. 1A may be converted to digital video signals via, for example, analog to digital conversion (ADC). Common applications for digital video signals include, for example, multimedia, video-conferencing, television, magnetic resonance imaging, and remote-sensed imaging. As is well known, digital video signals may be processed via a computer system for display as video images on a suitable video display device.

Color video images typically include three components. Each component may be thought of as being comprised of a two dimensional array of samples, with each sample being a digital representation of the intensity of a component at a point on a raster line. The color of a pixel itself may be expressed in terms of a luminance component and two chrominance components. These components may, as is well known, be readily converted into the familiar red, green, and blue (RGB) primary colors or other sets of primary colors. The sample values at a point in a picture form a picture element (pixel or pel). If all three components use the same sampling grid, each pixel has three samples, one from each component.

The quality of a digital video image is typically a function of its resolution, which may be measured in a number of horizontal and vertical pixels in the image. As the number of pixels increases, the resolution of the image increases. As the resolution of an image increases, unfortunately, the amount of digital video data required to store or transmit the image correspondingly increases.

To reduce the number of digital bits required to store and/or transmit an image, compression is often performed. One of the objectives of video data compression is to maximize picture quality while minimizing the data required per pixel. By way of background, current video compression techniques include two major categories: entropy processes, or information preserving processes, and information losing, or so called "lossy" processes. Entropy processes introduce no errors in the encoding/decoding process so that the original signal may be reconstructed exactly. However, entropy processes tend to have a small compression ratio, i.e., a small reduction in video bit rate. Conversely, "lossy" compression processes tend to introduce errors in the encoding/decoding process but achieve much higher compression ratios. To strike an acceptable compromise between quality and compression ratio, typical digital video compression processes may combine both entropy coding processes and "lossy" coding processes.

A video frame may be compressed in accordance with either an intra compression technique or a nonintra compression technique. Intra compression techniques compress a video frame using information only from that video frame. Contrarily, nonintra compression techniques compress a video frame using information from one or two other video frames displaced in time. Nonintra compression techniques include, for example, predictive coding techniques. Predictive coding techniques are based on previously transmitted and decoded spatial and/or temporal information. Predictors may employ pixels from a current frame or from previous frames. Motion compensated predictive coding is a type of predictive coding which takes into account the frame to frame displacement of moving objects in a sequence.

A variety of standards have emerged in the video industry for digital video compression. Digital Video (DV) is one such compression standard. The DV compression standard is commonly employed for compressing digital video data generated by, for example, a DV camcorder for storage on digital video tape (DV tape). DV includes versions which are designed to interface with specific analog video standards. DV includes an NTSC version (DV-NTSC) and a PAL version (DV-PAL). In addition, DV includes a standard definition version (DVSD), a reduced bit rate version, a high definition version, and a Sony version developed by Sony Corporation.

In the DV format, two basic forms of a discrete cosine transform (DCT) are used to transform picture sample values into frequency domain components, which may then be transmitted with a reduced bandwidth. These include a still DCT process used for a still type sample block and a motion DCT process used for a motion type sample block. As the terms are used herein, a still type sample block is a two dimensional array of samples in which where there is not much difference between interleaved fields of an analog video frame. A motion type sample block is a two dimensional array of samples in which there is a significant difference between interleaved fields of an analog video frame.

To facilitate discussion, a diagram representing a still type DCT based video encoding process for a still type 8×8 video sample block 108 is shown in FIG. 1B. The still type 8×8 sample block 108 includes 64 samples 110. In the DV format, the still type 8×8 sample block 108 is transformed, using a standard DCT form, into an 8×8 DCT block 112. The 8×8 DCT block 112 has 64 spatial frequency patterns including a DC spatial frequency pattern 114 and 63 AC spatial frequency patterns 116.

The DC spatial frequency pattern 114 is located in row zero, column zero of the 8×8 DCT block 112. The DC spatial frequency pattern 114 has a DC coefficient value and each of the 63 AC spatial frequency patterns 116 has an AC coefficient value. The DC coefficient value of the DCT block 112 is equal to the average of each of the AC coefficient values of the DCT block 112. In the DV format, further encoding steps are typically included for implementing a zigzag based scan 118 of the DCT block 112.

With reference to FIG. 1C, diagram representing a motion type DCT based encoding process for a motion type 8×8 video sample block 120 is shown. The motion type 8×8 video sample block 120 includes 64 samples 110. The motion type 8×8 video sample block 120 is encoded in the DV format by performing two 8×4 DCTs; one on a sum of interleaved lines from separate fields of the video frame and one on a difference between interleaved lines from the separate fields of the video frame. The DV format motion type DCT based encoding process yields a first zigzag based 8×4 DCT block 122 and a second zigzag based 8×4 DCT block 124 when performed on the motion type 8×8 video sample block 120. In the DV format, further encoding steps are typically included for implementing a zigzag based scan 123 of the first 8×4 DCT block 122 and a zigzag based scan 125 of the second 8×4 DCT block 124.

In addition to the above described frequency domain encoding processes, the DV format encoding process typically utilizes a form of entropy coding called run length encoding (RLE). In the DV format, specific RLE codes are derived from a table which is set forth in the DV standard "Blue Book." RLE codes are used to compress a digital video bit stream by taking advantage of repetitive patterns of zeros and ones. The RLE codes, which are of a variable length, are segmented in the DV format within a DV encoded video bit stream. The outer most layer of the DV encoded video bit stream includes DV format video segments.

With reference to FIG. 1D, a DV format video segment 126 is shown. The video segment 126 typically includes 5 compressed macroblocks (CMBs) 128. Each CMB 128 usually includes six DCT blocks 130. Of the six DCT blocks 130 in each CMB 128, four are luminance DCT blocks 131 (Y0, Y1, Y2, and Y3) and two are chrominance DCT blocks 132 (Cr and Co). Therefore, the video segment 126 typically includes 30 DCT blocks 130. In the DV format, each luminance DCT block 131 (Y0, Y1, Y2, and Y3) typically includes 100 bits and each chrominance DCT block 132 (Cr and Co) typically includes 68 bits. The DV format typically uses 4-1-1 sampling.

In the DV format, RLE coded data is typically distributed throughout each video segment according to a unique protocol. With reference still to FIG. 1D, the RLE data is distributed throughout the video segment 126 using three passes. In the first pass, RLE data is stored in allotted areas for each DCT block 130 in a video segment 126. The second pass finds unused areas in each CMB 128 and stores further RLE bits into those areas. The third pass finds any free space in the video segment 126 and stores any remaining RLE bits in that space until the space runs out or until there are no more bits left.

The above described process of distributing RLE coded data in the DV format provides advantages in terms of video picture quality and integrity. With reference still to FIG. 1D, the top CMB 128 represents samples corresponding to a center of a display screen. Since the above described bit packing scheme always starts at the top CMB 128 when looking for extra space, the top CMB 128 receives first priority and therefore is most likely to contain more information than the other four CMBs 128 of a video segment 126. Because the CMB 128 corresponds to the center of the display screen, the center of the display screen is well defined. This feature of the DV format minimizes loss of picture quality in the event that drop out occurs on a DV video tape.

Video data encoded in the DV format, as described above, must be decoded in order to render a video image. One problem in decoding video images, compressed in the DV format, is that a very large amount of processing time is required to fully decode the video data. The amount of processing time required to decode compressed video data is proportional to the resolution of the image represented by the data. The full DV-NTSC format encodes a 720×480 image and the full DV-PAL encodes a 720×576 image. For full resolution decoding of DV encoded data, a Pentium microprocessor operating at 133 Megahertz (Pentium 133) may process about two frames per second. A real time decoding rate refers to a rate fast enough to satisfy human visual perception of motion. A decoding rate of 20 to 30 frames per second (30 fps) is generally accepted as a satisfactory real time decoding rate.

It is well known to those skilled in the art of video compression that there are typically three decoding subprocesses in the DV format which require a large amount of processing time: (1) performing the inverse discrete cosine transform (IDCT), (2) unpacking the inverse run length encoded (RLE) AC coefficient values from each video segment, and (3) color space conversion. The large amount of processing time required to decode DV-formatted video data renders quality video display all but impossible on some computer systems. For example, typical personal computers which include central processing units such as, for example, the Intel Pentium Processor, require too much to decode full resolution DV-formatted video data.

Regarding the first two sub-processes, to provide a partial solution to the above described processing time problems, the DV format allows for a reduced resolution fast preview decoding option. To accomplish this, the DV format embeds a DC coefficient of each DCT block in an easy-to-read location and format, allowing a DC preview which is effectively one pixel per DCT block. DC preview decoding typically corresponds to a 90×60 resolution for DV-NTSC and a 90×72 resolution for PAL. As an example of DC preview decoding, a Pentium microprocessor operating at 133 Megahertz (Pentium 133) may require about 3 to 4 milliseconds to process a single video frame. Although a preview based on displaying these DC values provides real time decoding of the image, at 30 frames per second (fps), on a Pentium 133, the DC preview image may still have too low a resolution and sacrifice too much detail to be acceptable for some video applications. Faster decoding of video data in video editing applications in order to provide faster video editing functions. Faster decoding of video data also allows for displaying higher resolution real time video images.

As can be appreciated from the foregoing, full resolution decoding of DV encoded data requires an undesirable large amount of processing time due to the processing intensive requirements of performing IDCTs and unpacking RLE coded data. While DC preview decoding of DV encoded data may be achieved without requiring an undesirable large amount of processing time, DC preview decoding tends to provide low resolution video images. Therefore, what is needed is a reduced-quality resolution DV codec which provides video images having adequate resolution without demanding an undesirable large amount of processing time to decode.

SUMMARY OF THE INVENTION

The present invention provides a reduced-quality resolution DV codec which receives a DV encoded video bit stream and reads information, including descriptor information, for a current discrete cosine transform block (DCT block). It is determined whether a sequential flag is set. If the sequential flag is set, the process stores codes and determines whether descriptors of the current DCT block are within tolerance of descriptors of the corresponding DCT block in the previous decoded frame. If so, the process uses the corresponding DCT block from the previous decoded frame for the current DCT block. Otherwise, the process may decode the current DCT block.

To decode the current DCT block, it is first determined whether the current DCT block is a still block or a motion block. If the current DCT block is a still DCT block, the RLE bit stream for the current DCT block is decoded to obtain a DC coefficient value and a desired number, n, of AC coefficient values for the current still DCT block. A reduced coefficient still block inverse discrete cosine transform (IDCT) is then performed on coefficient values to yield pixel values for the current still DCT block.

If the current DCT block is a motion DCT block, the RLE bit stream for the current motion DCT block is decoded to obtain a desired maximum number, m, of AC coefficient values for the current motion DCT block. A reduced coefficient motion block type IDCT is performed on coefficient values to yield pixel values for the current motion DCT block. If necessary, a color space conversion may be performed on the pixel values yielded for the current DCT block. Decoded pixel information may then be stored in an appropriate location.

The reduced-quality resolution DV codec, according to aspects of the present invention, provides real time decoding of DV encoded video data with a resolution that is considerably better than that of a DC preview. The present invention provides these real time decoded high resolution images while minimizing the number of instructions which must be executed over a host processor implementing the present invention. A reduced-quality resolution DV codec, according to aspects of the present invention, provides real time decoded video images while taxing a host processor much less than a typical full resolution DV codec taxes the host processor. The process of the present invention provides these advantages by minimizing the number of processor instructions required for performance of each IDCT and by minimizing the number of AC coefficients used to decode each DCT block.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following detailed description of the present invention, numerous specific details are set forth in order to provide a thorough understanding of the present invention. However, it will be obvious to one skilled in the art that the present invention may be practiced without these specific details or by using alternate elements or processes. In other instances well known processes, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. Herein, these signals are referred to as bits, values, elements, symbols, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that terms such as "processing", "performing", "decoding", "determining", "building" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

A mid-resolution DV codec, according to one aspect of the present invention, provides real time decoding of DV encoded video data. The present invention provides video images having a resolution considerably better than that of a DC preview while minimizing the number of instructions which must be executed over a host processor. The present invention advantageously minimizes the number of processor instructions required for decoding by minimizing a number of processor instructions required for performance of inverse discrete cosine transforms and for unpacking of run length encoded AC coefficients.

Figure 1A:
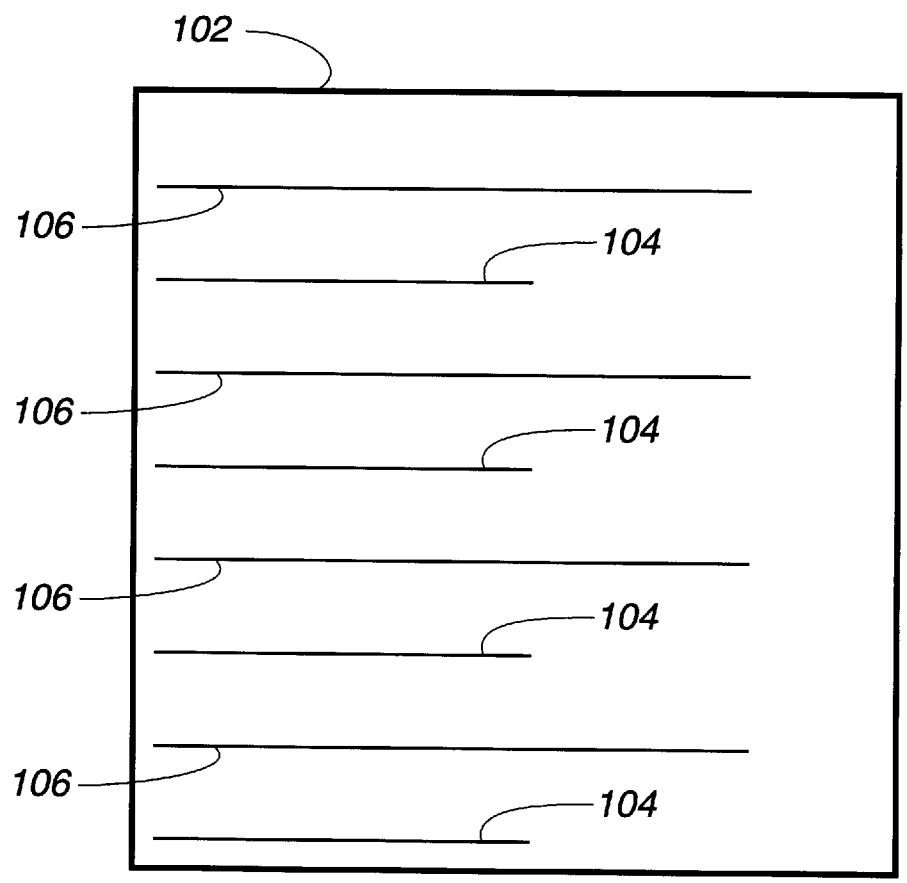
FIG. 1A is a diagram representing an analog video frame having interleaved fields.
Figure 1B:
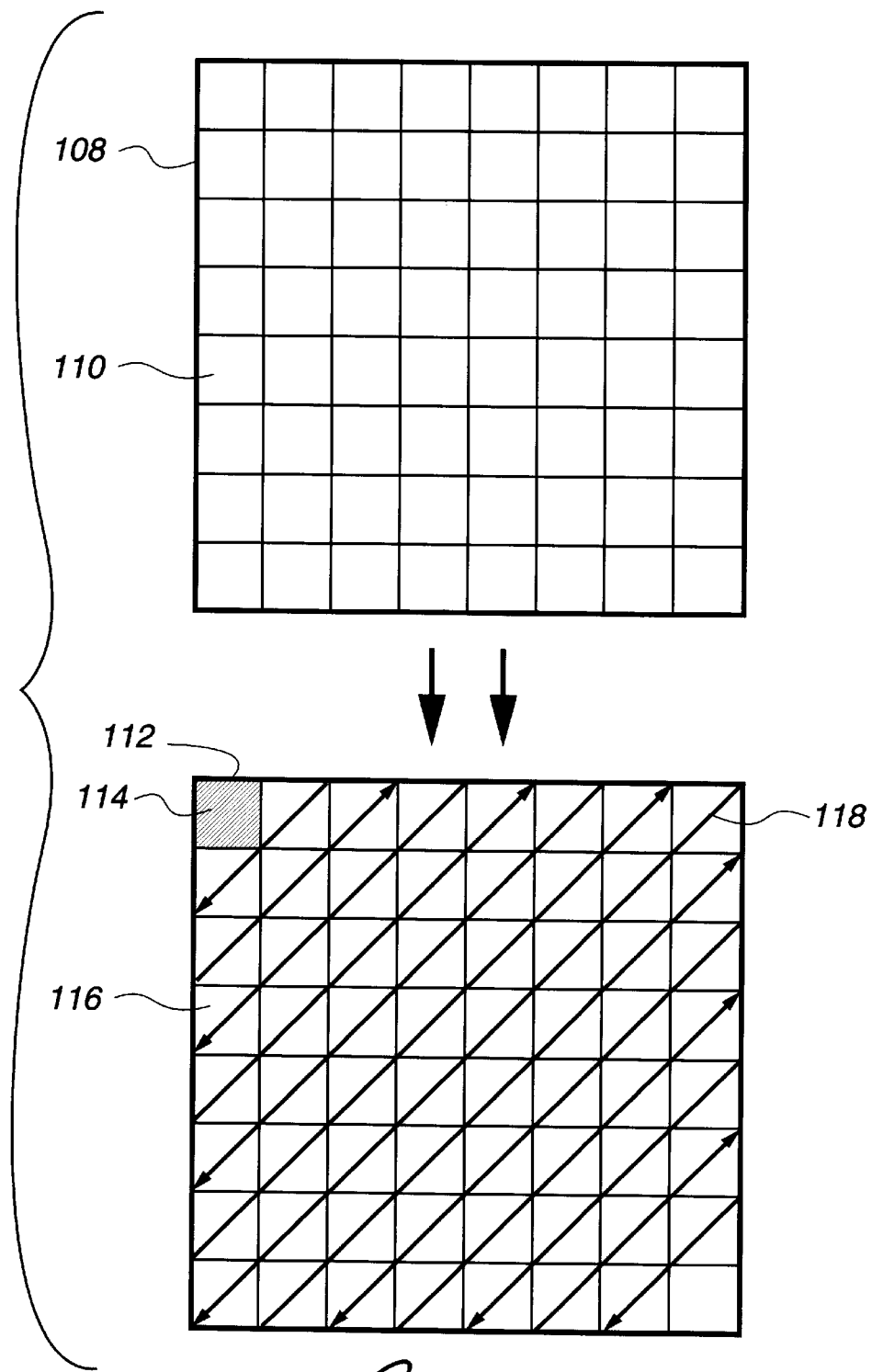
FIG. 1B is a diagram representing a DV format DCT based video encoding process for an 8×8 still type sample block.
Figure 1C:
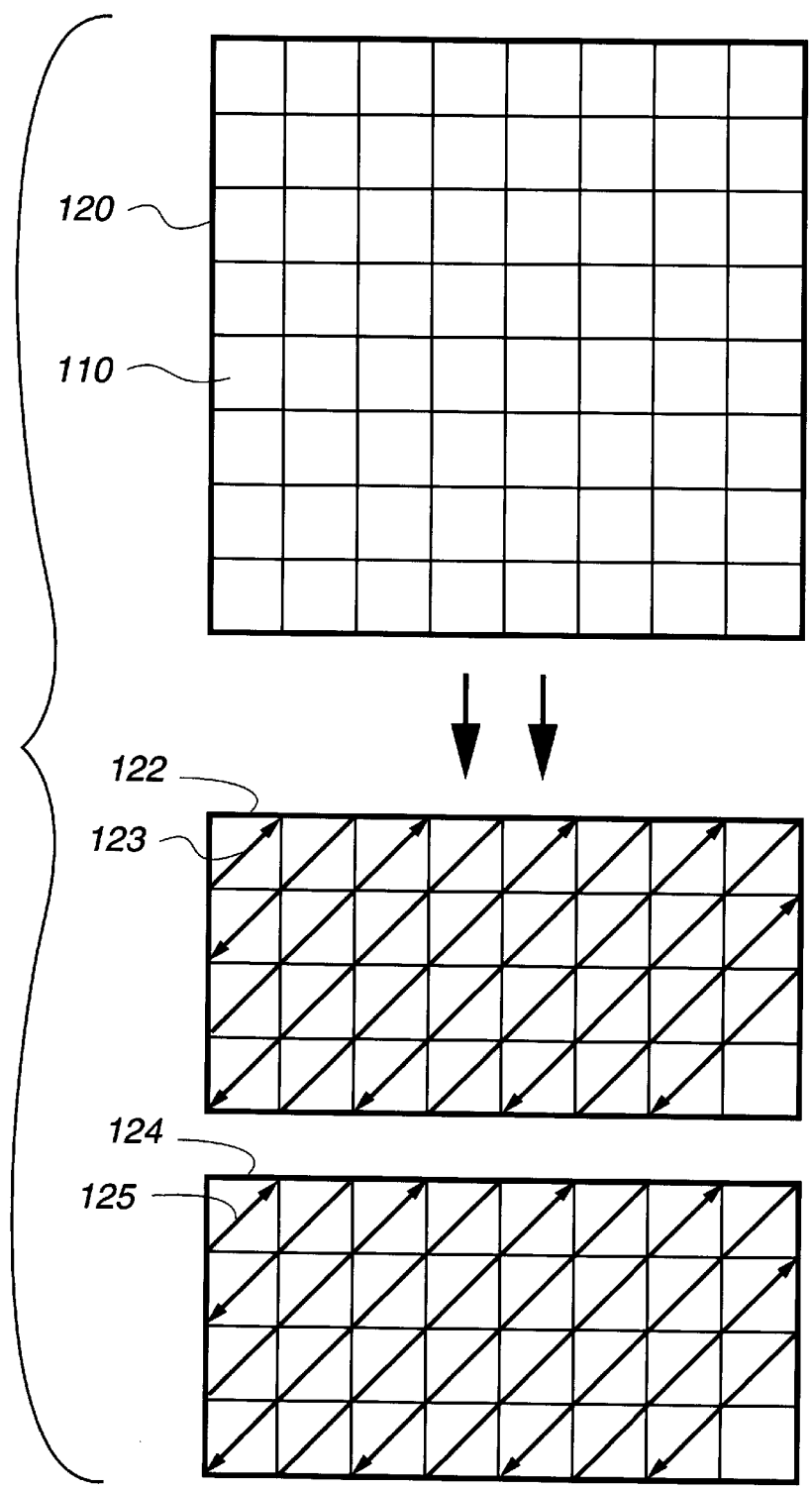
FIG. 1C is a diagram representing a DV format DCT based video encoding process for an 8×8 motion type sample block.
Figure 1D:
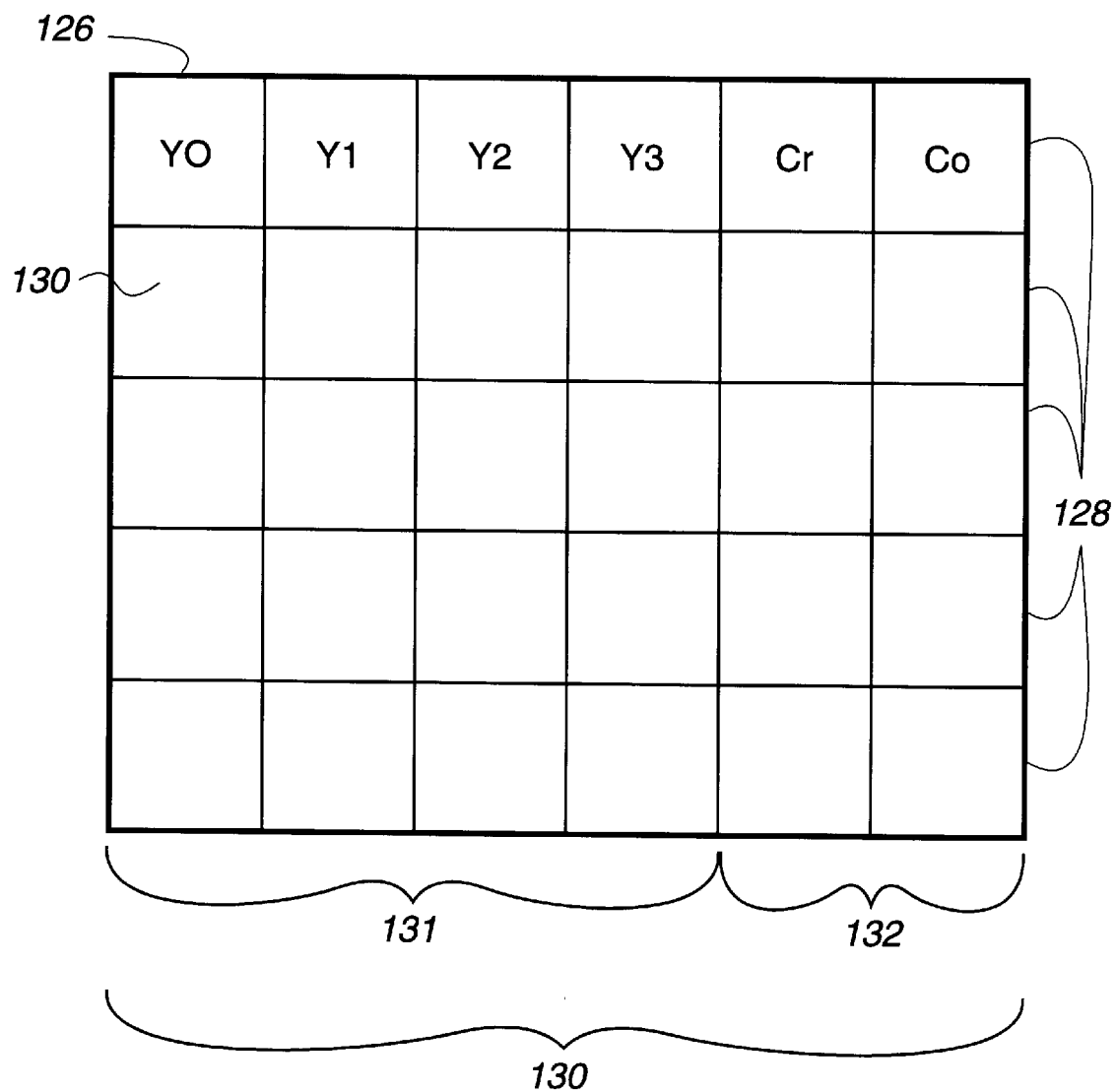
FIG. 1D is a diagram representing a video segment used in the DV format.
Figure 2A:
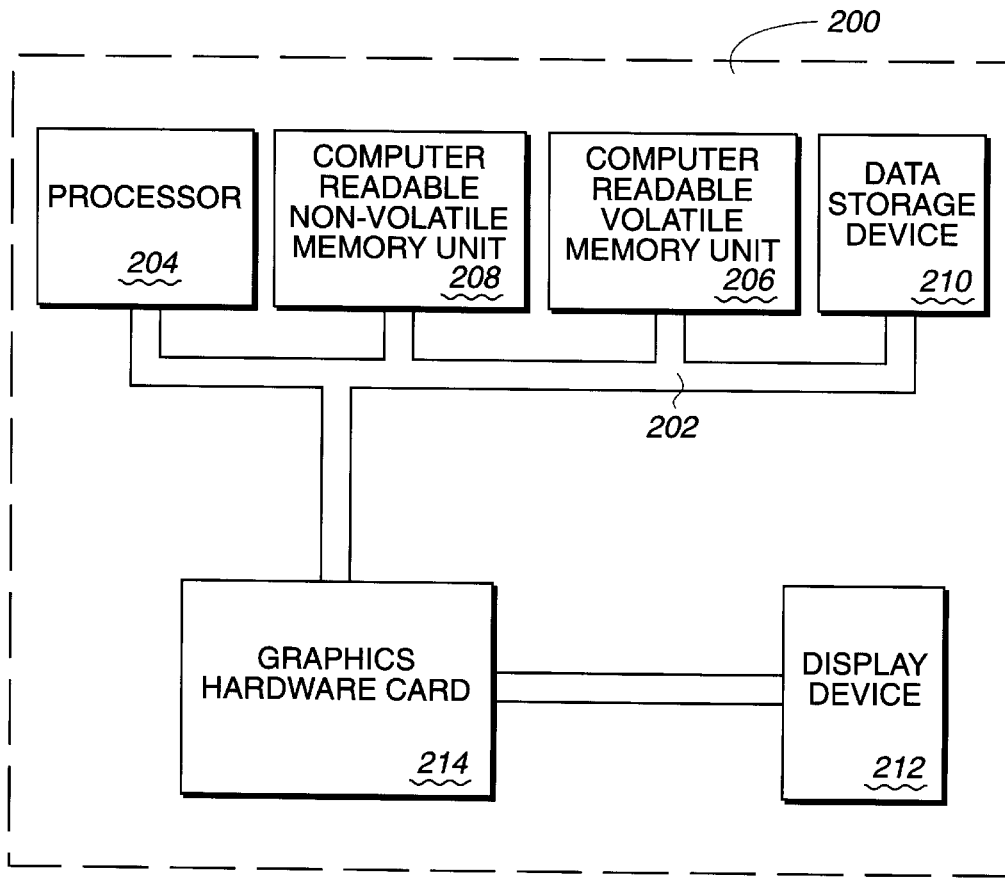
FIG. 2A is a diagram of an exemplary host computer system for implementing a reduced-quality resolution DV codec according to an embodiment of the present invention.

Refer to FIG. 2A which illustrates a host computer system 200. In general, host computer systems 200 used by the preferred embodiment of the present invention comprise a bus 202 for communicating information, a host processor 204 coupled with the bus 202 for processing information and instructions, a computer readable volatile memory unit 206 (e.g., random access memory unit) coupled with the bus 202 for storing information and instructions for the host processor 204, a computer readable non-volatile memory unit 208 (e.g., read only memory unit) coupled with the bus 202 for storing static information and instructions for the host processor 204, a data storage device 210 such as a magnetic or optical disk and disk drive coupled with the bus 202 for storing information and instructions. The computer readable volatile memory unit 206, computer readable non-volatile memory unit 208, and data storage device 210 provide examples of a computer storage medium suitable for storing program instructions for implementing processes according to the present invention.

The host computer system 200 also includes a display device 212 coupled to the bus 202, for displaying information to the computer user, and a graphics hardware card 214 coupled to the bus 202. The graphics hardware card 214 may contain a display processor which executes a series of display instructions found within a display list. The host processor 204 or display processor supplies data and control signals to a frame buffer which refreshes the display device 212 for rendering images on the display device 212.

Figure 2B:
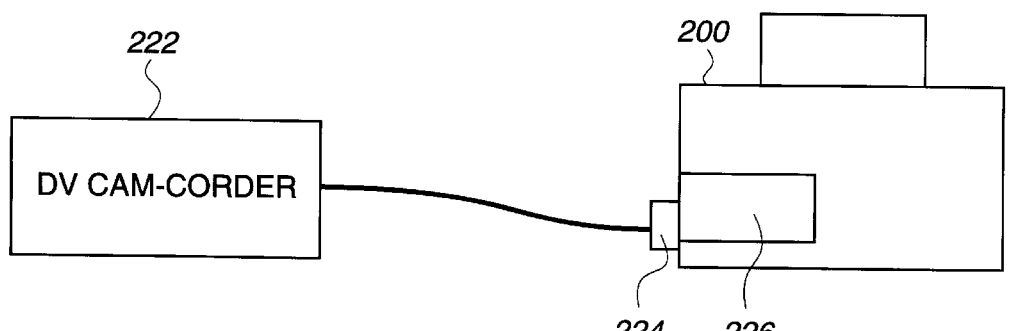
FIG. 2B is a diagram of a DV camcorder coupled to the host computer system for implementing the reduced-quality resolution DV codec of the present invention.

Refer to FIG. 2B which shows a diagram of an exemplary DV camcorder 222 connected to the computer system 200 (FIG. 2A) via a cable and a connector 224. The computer system 200 may include a DV plug in board 226 which is used to interface the DV camcorder 222 to the host computer system 200. The DV camcorder 222 provides DV standard format encoded data to the host computer system 200.

Figure 2C:
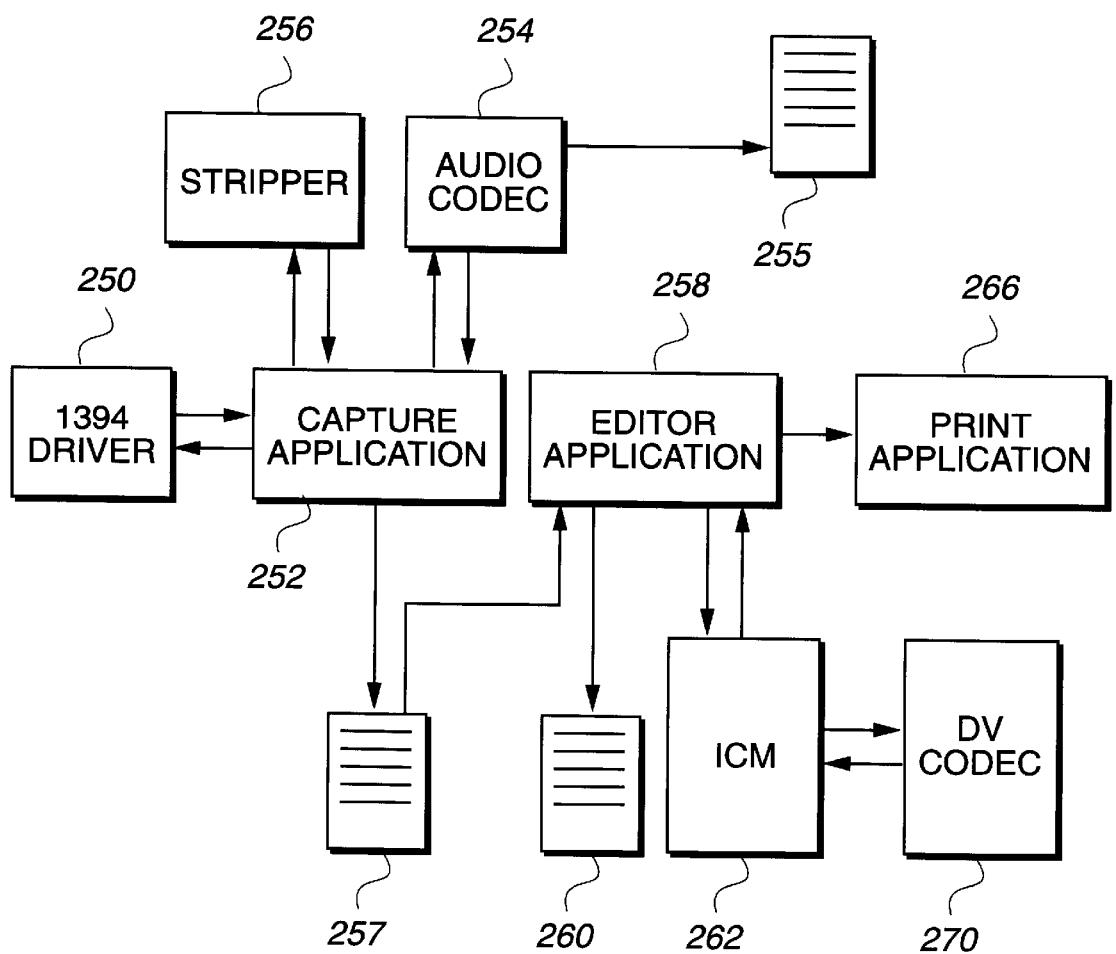
FIG. 2C is a detailed circuit block diagram of exemplary hardware and software components for implementing a reduced-quality resolution DV codec according to one embodiment of the present invention.

Refer to FIG. 2C which shows a block diagram of exemplary hardware and software components for use in conjunction with implementing a reduced-quality resolution DV codec according to an embodiment of the present invention. A software driver 250 receives DV data from the DV camcorder 164 of FIG. 3A. DV encoded video data may be transmitted over an interconnect using any type of transmission protocol. IEEE standard 1394 protocol is an example of a transmission protocol for a serial bus which may be used to transmit DV encoded video data. Custom transmission protocols, such as those used by Sony or Panasonic, may also be used to transmit DV encoded video data. The driver software 250 may be an IEEE standard 1394 type hardware driver. A capture application 252, executed over the host processor 204 of FIG. 2A, receives raw DV encoded data from the API driver 250.

With reference still to FIG. 2C, an audio codec application 254 receives the raw DV encoded data from the capture application 252. The audio codec application 254, which may be executed over the host processor 204 of FIG. 2A, is used to strip away audio portions of the raw DV encoded data. The audio codec application 254 creates an audio wave file 255 which includes the captured audio data portion of the raw DV encoded data. The audio wave file 255 may be stored into one of the a computer readable memory units of the host computer system 200 of FIG. 2A. A stripper application 256 receives the raw DV encoded data from the capture application 252 and removes header data therefrom. The stripper application 256 also synchronizes the DV encoded data to a beginning of each video frame. The capture application 252 receives and processes the header stripped and frame synchronized DV data from the stripper application 256. The capture application 252 then creates an AVI file 257 which includes the header stripped and frame synchronized DV data and the captured audio data portion of the audio wave file 255. The AVI file may be stored into one of the computer readable memory units of the host computer system 200 of FIG. 2A. The AVI file 257 includes both audio and video data.

With reference still to FIG. 2C, a video editor application 258 receives the AVI file 257 and edits it as desired to create an edited AVI file 260. For example, a video editor application 258 may be used to enhance or change the contents of a video image. In an embodiment of the present invention, the editor application 258 may be Adobe Premier which is available from Adobe Systems Incorporated of San Jose, Calif. The edited AVI file 260 is provided to an installable compression manager (ICM) 262. The ICM 262 provides the edited AVI file 260 to a DV codec 270 according to one embodiment of the present invention. By way of example, under the MICROSOFT operating system, an ICM is a software driver that interfaces "Video For Windows" to a user's custom video format. An ICM may also be a similar manager or a "plug-in" such as available under QUICK-TIME software.

The DV codec 270, in accordance with one embodiment of the present invention, receives a call from the ICM 262. The contents of the call may be varied to suit various needs. In one embodiment of the present invention, the call includes a DV frame, a bit map buffer address, and a plurality of options. The options may include a specified bit map size which causes the DV codec 270 of the present invention to determine what resolution image to decode for. For example, for a specified bit map size of 90×60, the DV codec of the present invention may perform a DC preview decoding process according to well known methods. For a specified bit map size of 720×480, the DV codec of the present invention may perform a full size decoding process. The options may also include format specifications for a bit map (e.g. color space, Macintosh, IBM, 16 bit, 24 bit, 32 bit). The options may further include sequential block flags and a last frame description buffer. The sequential block flags indicate whether a current encoded video frame is sequential in time with a previous encoded video frame. Additionally, the options may include desired quality flags such as a number of AC coefficient values to use to decode images if a bit map size specification from the ICM 262 calls for reduced-quality resolution decoding.

The DV codec 270 may also partially decode the DV format encoded data into smaller than full size DV video images with more detail than the DC preview and much more speed than full size DV video to enable a preview of a DV clip during editing on a mainstream computer. According to one embodiment of the present invention, the DV codec 270 receives a DV encoded video bit stream and generates a 360×240 output video image for DV-NTSC and a 360×288 output video image for DV-PAL.

Figure 3A:
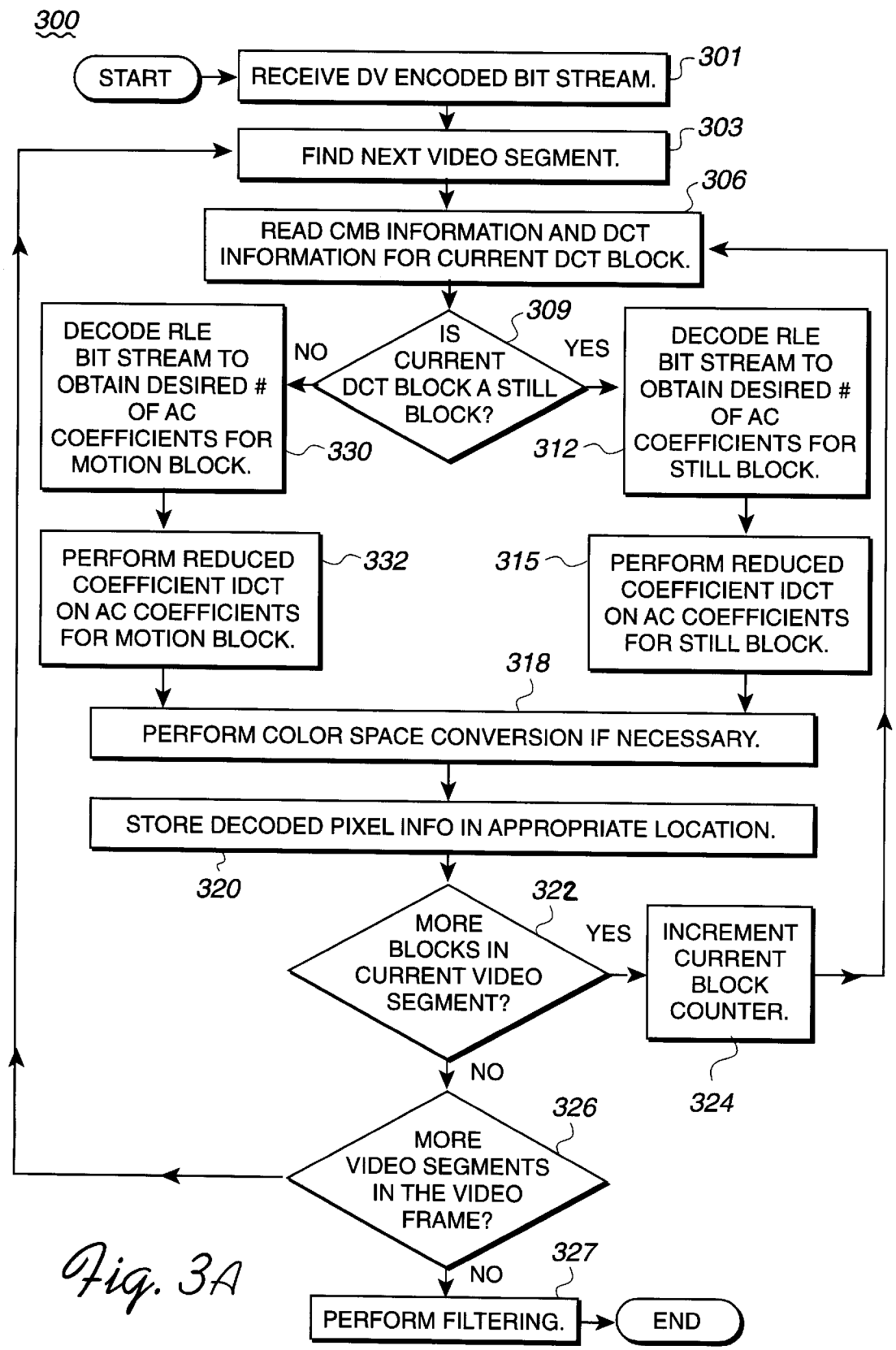
FIG. 3A is a flow diagram of a reduced-quality resolution DV codec process according to one embodiment of the present invention.

With reference to FIG. 3A, a flow diagram of a DV codec process 300 according to the present invention is shown. The DV codec process 300 provides reduced-quality resolution decoding of digital data encoded in a DV format. Step 301 receives a DV encoded bit stream. In an embodiment of the present invention, the DV codec process 300 generates a 360×240 output video image for DV-NTSC and a 360×288 output video image for DV-PAL. In an embodiment of the present invention, the DV encoded bit stream is received from the ICM 262 of FIG. 2C. Also, in an embodiment of the present invention, the DV codec process 300 may be executed by multiple threads of the host processor 204 of FIG. 2A. In another embodiment of the present invention, the DV codec process 300 may be executed in parallel over a plurality of host processors 204 (FIG. 2A).

Figure 3B:
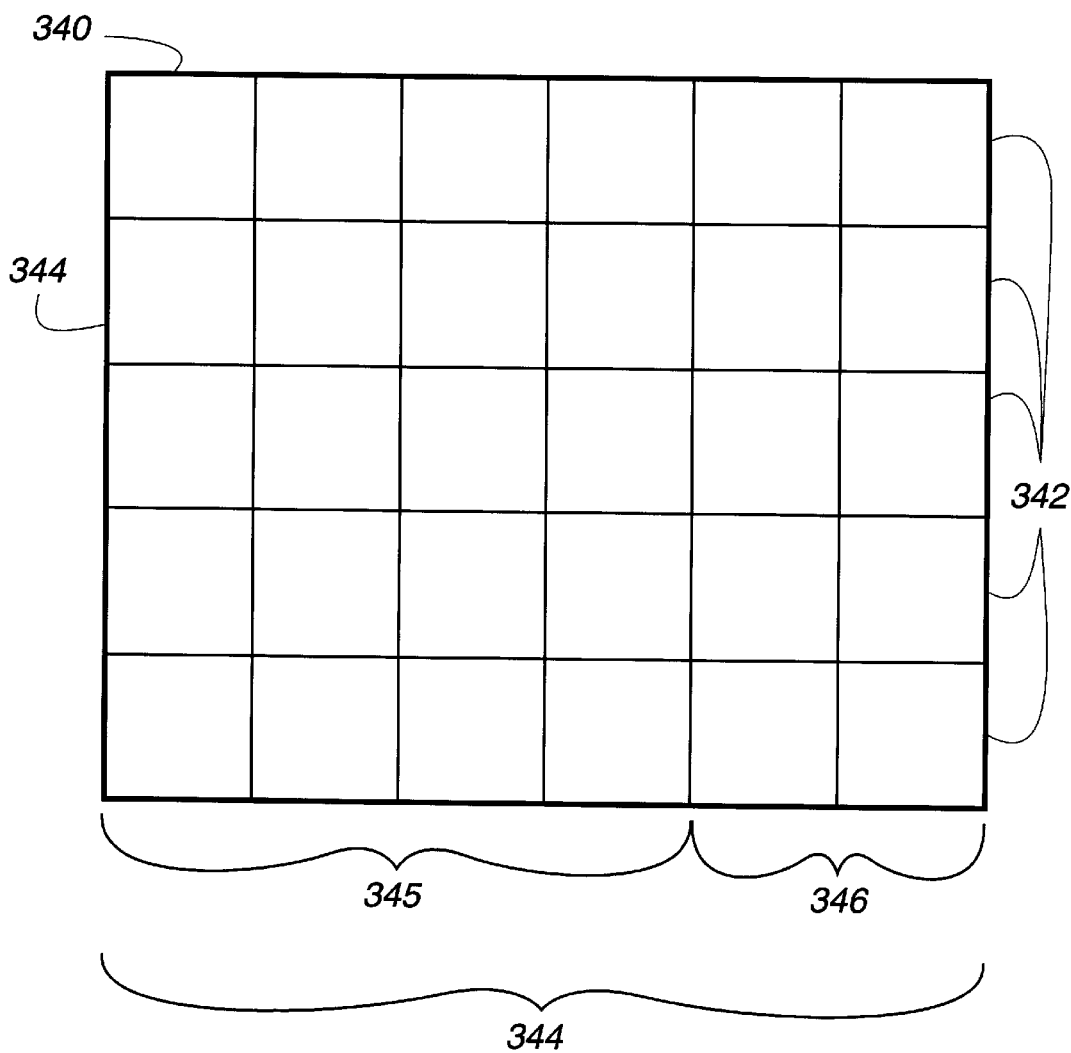
FIG. 3B is a diagram representing an exemplary encoded video segment used in the DV standard format.

With reference to FIG. 3B, a DV format video segment 340 is shown. The DV format video segment 340 is the outermost layer of a DV video bit stream. The DV format video segment 340 includes 5 compressed macroblocks (CMBs) 342. Each CMB 342 may include six DCT blocks 344. Of the six DCT blocks 344 in each CMB 342, four are luminance DCT blocks 345 (Y0, Y1, Y2, and Y3) and two are chrominance DCT blocks 346 (Cr and Co). Therefore, the video segment 340 may include 30 4DCT blocks 344. In the DV format, each luminance DCT block 345 (Y0, Y1, Y2, and Y3) may include 100 bits and each chrominance DCT block 346 (Cr and Co) may include 68 bits. The DV format uses 4-1-1 sampling.

With reference back to FIG. 3A, step 303 finds a next video segment in the DV encoded bit stream. Subprocess 306 reads CMB information and DCT information for a current DCT block and determines whether to use a corresponding DCT block from a previous decoded frame. Subprocess 306 is described further below.

Step 309 determines whether the current DCT block is a still DCT block or a motion DCT block. If the current DCT block is a still DCT block, process 300 proceeds to Subprocess 312 which decodes run length encoded (RLE) data in the DV encoded bit stream for the current DCT block to obtain a desired number of AC coefficient values for the current still DCT block. Subprocess 312 is described further below. Subprocess 315 performs a reduced coefficient still block inverse discrete cosine transform (IDCT) on the AC coefficient values obtained in the subprocess 312. Subprocess 315 is described further below. Subprocess 315 yields decoded reduced-quality resolution pixel information for the current still DCT block.

If the current DCT block is a motion DCT block, process 300 proceeds to subprocess 330. Subprocess 330 includes a motion DCT block RLE decoding process which is described below. Subprocess 330 decodes the RLE bit stream for the current motion DCT block to obtain the desired number of AC coefficient values for the current motion DCT block. Subprocess 332 performs a reduced coefficient motion block type IDCT on the AC coefficient values obtained in subprocess 330 above. Subprocess 332 is a reduced instruction motion DCT block IDCT process and is described further below. Subprocess 332 yields decoded reduced-quality resolution pixel information for the current motion DCT block.

With reference still to FIG. 3A, step 318 may perform color space conversion, if necessary, on the decoded pixel information. Step 318 may be varied to suit the needs of various applications. In one embodiment of the present invention, step 318 converts decoded YUV color space pixel components into RGB color space pixel components.

Step 320 stores the decoded pixel information in an appropriate location. Step 320 uses a standard DV table assuming that the size of the pixel information is scaled down by a factor of two. Step 322 determines whether there are more DCT blocks in the current video segment. If there are more DCT blocks in the current video segment, process 300 proceeds to step 324 which increments a current block counter. Process 300 then proceeds to step 306 which reads CMB information and DCT information for a next DCT block. If there are no more DCT blocks in the current video segment, process 300 proceeds to step 326 to determine whether there are more video segments in the current video frame. If there are more video segments in the current video frame, process 300 proceeds to step 303 which finds the next video segment. If there are no more video segments in the current video frame, process 300 proceeds to step 327 which performs any desired filtering on the decoded pixel information for the current video frame.

Figure 4:
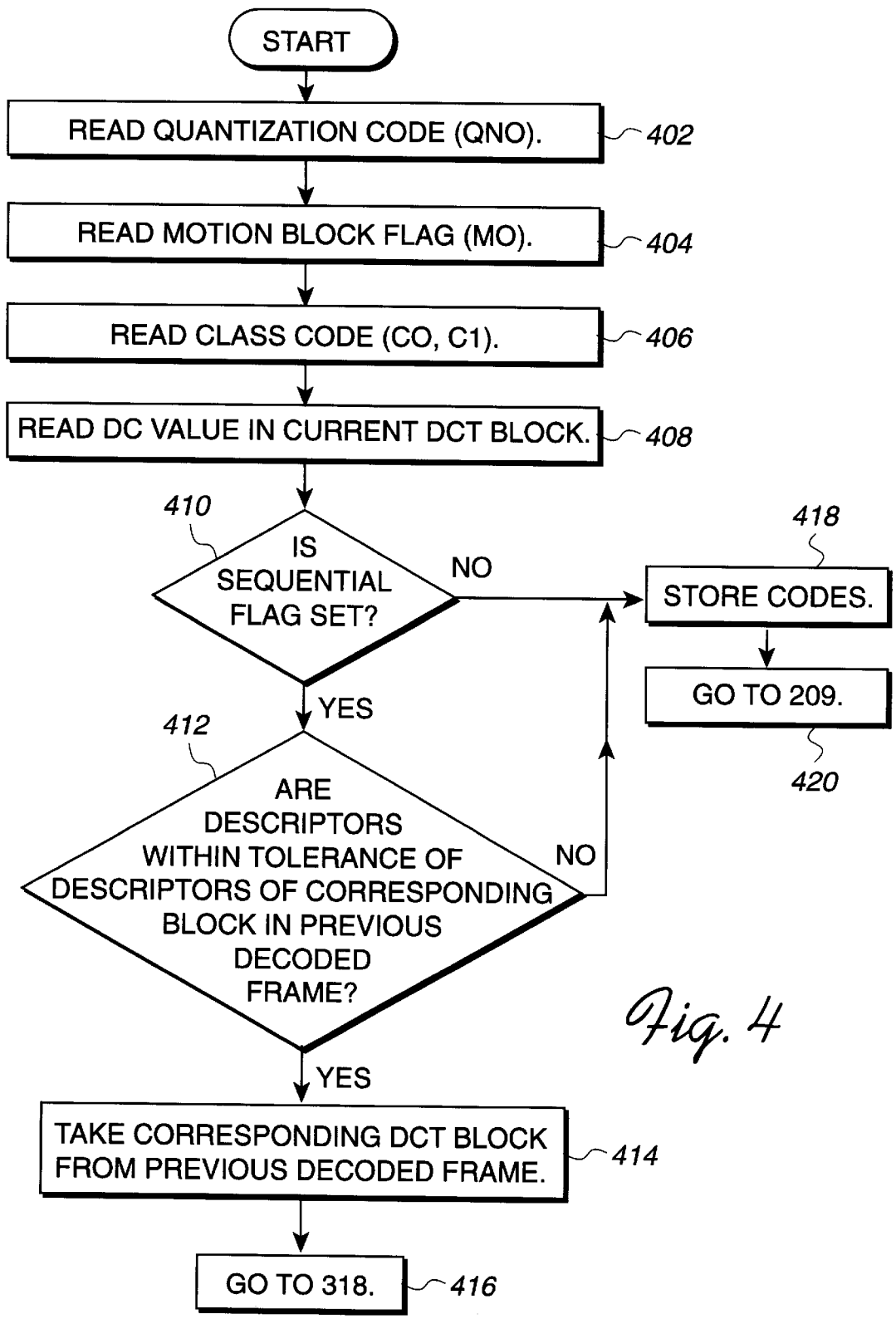
FIG. 4 is a flow diagram of a process, according to an embodiment of the present invention, for reading information for a current DCT block and determining whether to use a corresponding DCT block from a previous decoded frame.

With reference to FIG. 4, a flow diagram of the DV codec subprocess 306 according to one embodiment of the present invention is shown. Process 306 reads descriptor information for a current DCT block and determines whether to use a corresponding DCT block from a previous decoded frame. The descriptor information for each DCT block includes a quantization code (QNO), a motion block flag (MO), a class code (C0, C1), and a DC coefficient value.

Step 402 reads the quantization code (QNO) in the current DCT block. The quantization code (QNO) is a code by which coefficient values are divided in the DV format encoding process. There is only one quantization code (QNO) for each CMB. Step 404 reads the motion block flag (M0) in the current DCT block. The motion block flag (M0) in the standard DV format provides an indication as to whether the current DCT block is a motion type DCT block. Step 406 reads the class code (C0, C1) in the current DCT block. The class code (C0, C1) modifies the quantization code and allows for more levels of quantization. Each DCT block has a class code (C0, C1). Step 408 reads the DC coefficient value in the current DCT block. A DC coefficient value is located in row 0, column 0 of each DCT block (FIG. 3B).

Step 410 determines whether a sequential flag for the current video frame is set. A set sequential flag indicates whether the current encoded video frame and the previous encoded video frame are sequential in time. If the current encoded video frame and the previous encoded video frame are sequential in time, it is possible that a corresponding DCT block from a previous decoded frame may be used for the current DCT block. A corresponding DCT block from a previous decoded frame may be used for the current DCT block if the particular DCT block has not changed, beyond a certain tolerance, between the last video frame and the current video frame. If the sequential flag is set, process 306 proceeds to step 418 to store the codes received in the above steps. The codes, comprising the descriptors, for each DCT block are stored and tabulated for comparison to codes of subsequent DCT blocks. If the sequential flag is not set, process 306 proceeds to step 412.

Step 412 determines whether descriptors of the current DCT block are within tolerance of descriptors of the corresponding DCT block in a previous decoded frame. As stated above, the descriptor information for each DCT block of each frame is stored into an internal table for comparison to descriptor information of the corresponding DCT block in the next frame in the DV encoded bit stream.

If descriptors of the current DCT block are within tolerance of descriptors of the corresponding DCT block in the previous decoded frame, process 306 proceeds to step 414, which takes the corresponding decoded DCT block from the previous decoded frame. Process 306 then proceeds to step 414 which jumps to step 318 of the DV codec process 300 of FIG. 3A. In this case, there is no need to run length decode the current DCT block or to perform an inverse discrete cosine transform (IDCT) on the current DCT block. Therefore, the DV codec process 300 of FIG. 3A will proceed to step 318 of FIG. 3A. If descriptors of the current DCT block are not within tolerance of descriptors of the corresponding DCT block in the previous decoded frame, process 306 proceeds to step 418 to store the codes received in steps 402, 404, 406, and 408 above. In this case, process 306 proceeds to step 420 which jumps to step 309 of the DV codec process 300 of FIG. 3A. Subsequently, the DV codec process 300 will run length decode and perform an IDCT on the current DCT block.

Figure 5A:
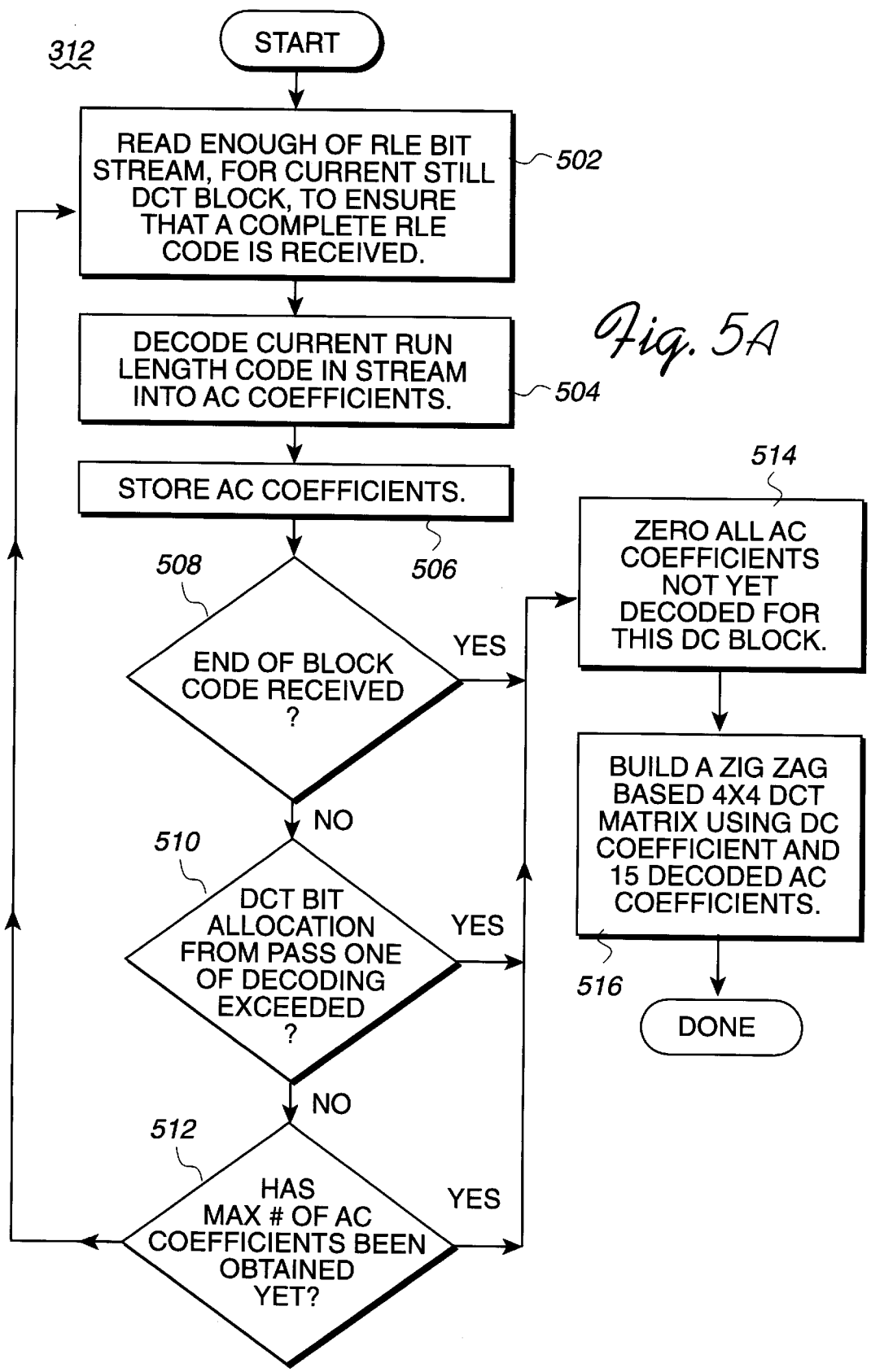
FIG. 5A shows a flow diagram of a still DCT block RLE decoding process, according to one embodiment of the present invention, for decoding an RLE bit stream to obtain a desired number of AC coefficient values for a still DCT block.

With reference to FIG. 5A, a flow diagram of the still DCT block RLE decoding process 312 according to one embodiment of the present invention is shown. Process 312 calls for decoding the RLE bit stream to obtain a desired number of AC coefficient values for a still DCT block. Process 312 is a process for unpacking RLE data from the DV encoded bit stream.

Step 502 reads enough of the RLE codes of the DV encoded bit stream for the current DCT block to ensure that a complete RLE code is received. In the DV format, an RLE code of each DCT block typically has a maximum of 16 bits. Step 502 may read the RLE code for a single current DCT block or may read the RLE code for more than one DCT block. Step 504 decodes the RLE code of the current DCT block to obtain AC coefficient values. Step 506 stores the AC coefficient values obtained in step 504. Step 508 determines whether an end of block code (EOB code) is received. The EOB code is a DV format code which indicates the end of a DCT block in the DV encoded bit stream. If the EOB code is received, process 312 proceeds to step 514 to zero all AC coefficient values not yet decoded for the current DCT block.

If the EOB code is not received in step 508, process 312 proceeds to step 510 which determines whether a DCT bit allocation from a first pass of decoding is exceeded. In the DV format, a maximum of 100 bits are typically allocated for each luminance DCT block and a maximum of 68 bits are typically allocated for each chrominance DCT block. The method of storing RLE data in a video segment is unique to the DV format. The RLE data is distributed throughout the video segment using three passes. In the first pass the RLE data is stored in the allotted area for each DCT block in the current video segment. The second pass finds unused areas in each CMB and stores further RLE bits into those areas. The third pass finds any free space in the video segment and stores any remaining RLE bits in that space until the space runs out or until there are no more bits left. In one embodiment of the present invention, the DV codec process ignores bits allocated during the second and third passes of the DV encoding process. If the DCT bit allocation from the first pass, pass one, of decoding is exceeded, process 312 proceeds from step 510 to step 514 to zero all AC coefficient values not yet decoded for the current DCT block. If the DCT bit allocation from pass one of decoding is not exceeded, process 312 proceeds to step 512.

Step 512 determines whether a maximum desired number of AC coefficient values for the current DCT block has been obtained. The desired number of AC coefficient values for each still DCT block may be set by a desired quality flag which may be received in the ICM call from the ICM 262 of FIG. 2C. The desired number of AC coefficient values may be varied to achieve video images of a varying resolution. In an embodiment of the present invention, the desired number of AC coefficient values for a still DCT block may be between 3 and 15. If the maximum number of AC coefficient values has not been obtained yet, process 312 proceeds back to step 502 to read an RLE bit stream for a next DCT block. If the maximum number of AC coefficient values has been obtained, process 312 proceeds to step 514 to zero all AC coefficient values not yet decoded for the current DCT block. Subsequently, process 312 proceeds to step 516 which builds a zigzag based reduced size DCT matrix using the DC coefficient value for the current DCT block and the desired number of AC coefficient values for the current DCT block.

In an embodiment of the present invention wherein the desired number of AC coefficients is 15, the still DCT block RLE decoding process builds a zigzag based 4×4 still DCT block using the DC coefficient value for the current DCT block and the 15 decoded AC coefficient values for the current DCT block. The 15 AC spatial frequency patterns are selected from within the area inside a curved line 521 of the 8×8 still DCT block 518 of FIG. 5B. Each of the AC spatial frequency patterns has an order value indicated in FIG. 5B. This process contributes to generating a 320×240 output video image for DV-NTSC and a 320×288 output video image for DV-PAL. In another embodiment of the present invention, wherein the desired number of AC coefficients is 3, the still DCT block RLE decoding process builds a zigzag based 2×2 DCT block using the DC coefficient value for the current DCT block and the 3 decoded AC coefficient values for the current DCT block. This process contributes to generating a 180×120 output video image for DV-NTSC and a 160×144 output video image for DVPAL.

Figure 5B:
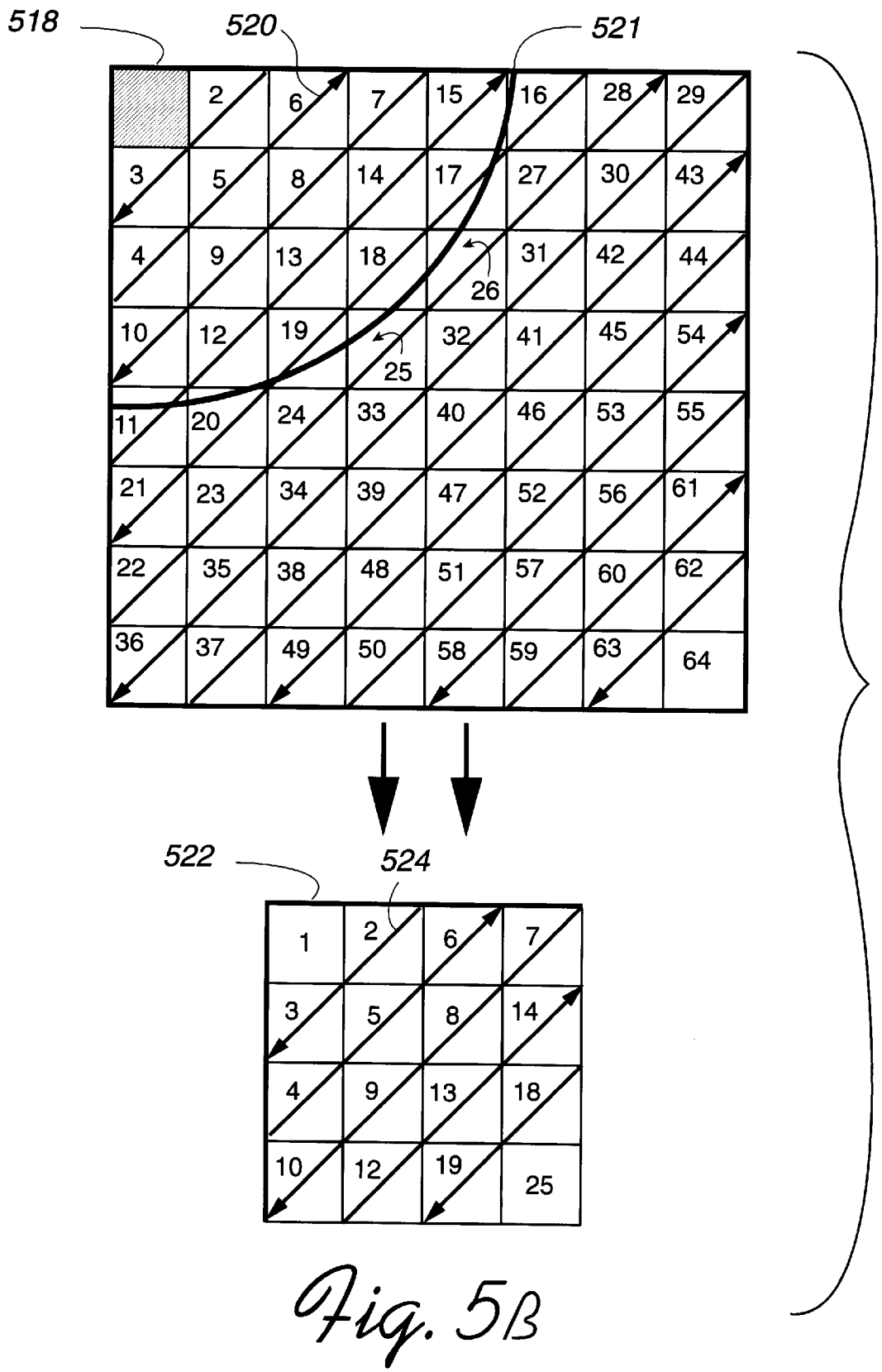
FIG. 5B is a diagram representing results of the still DCT block RLE decoding process applied to an 8×8 still DCT block.

Refer to FIG. 5B which shows a diagram representing results of the still DCT block RLE decoding process 312 of FIG. 5A applied to an 8×8 still DCT block 518. The end result of the process 312 is a zigzag based 4×4 DCT block 522 which includes a DC spatial frequency pattern, having a DC coefficient value, and 15 AC spatial frequency patterns each having an AC coefficient value. The 15 AC spatial frequency patterns are selected from within the area inside a curved line 521 of the 8×8 still DCT block 518 of FIG. 5B. Each of the AC spatial frequency patterns has an order value indicated in FIG. 5B. The still DCT block RLE decoding process 312 generates the 4×4 DCT block 522 from low frequency AC spatial frequency patterns of the 8×8 still DCT block 518. The frequency values of the AC spatial frequency patterns of the still DCT block 518 increase in the direction of the zigzag scanning order 520. Therefore, the lowest frequency AC spatial frequency patterns lie in the upper left portions of the DCT block 518. Step 504 of FIG. 5A decodes the AC spatial frequency patterns in the zigzag scanning order 520 shown in FIG. 5B.

Figure 6A:
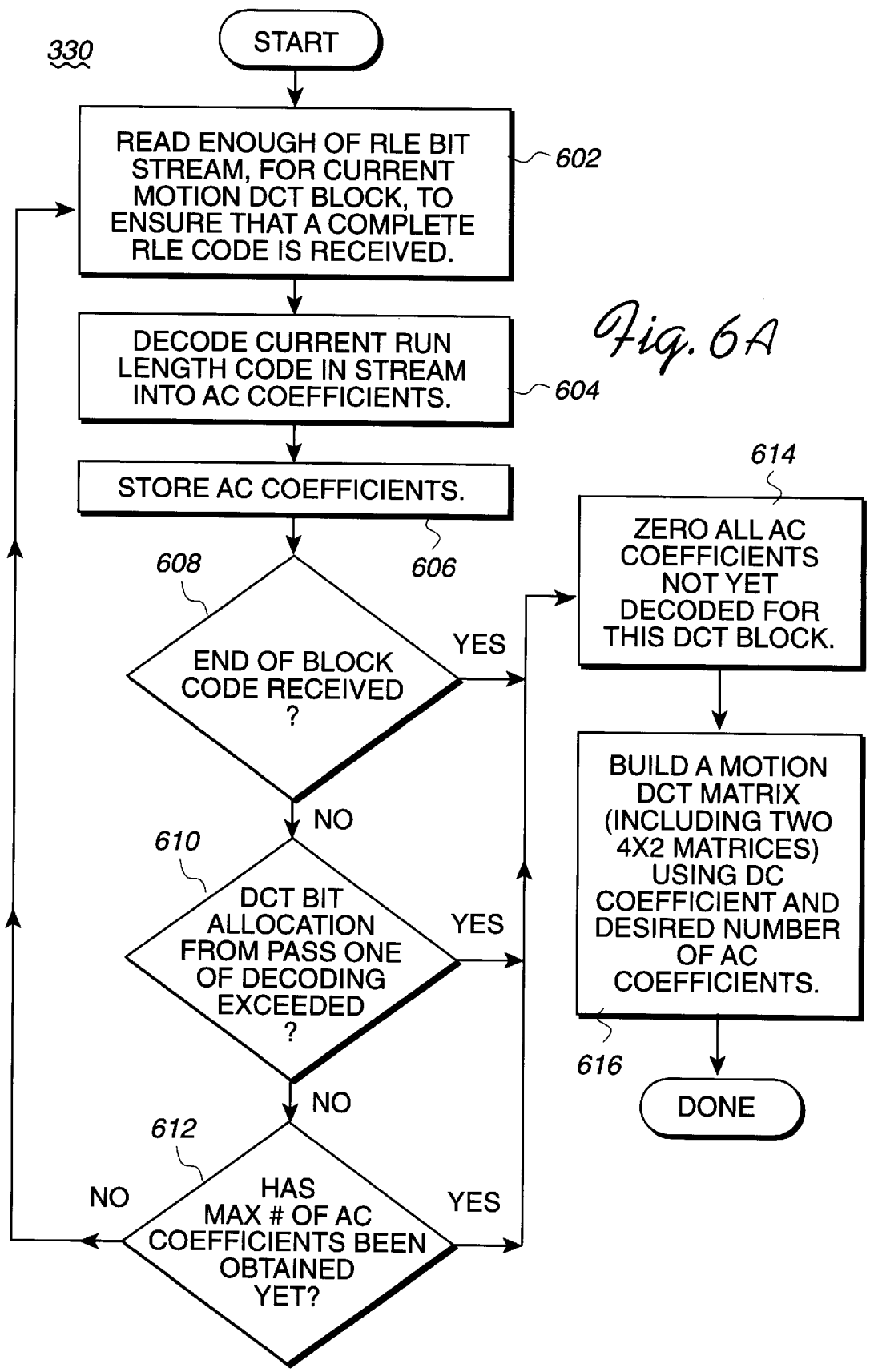
FIG. 6A is a flow diagram of a motion DCT block RLE decoding process according to one embodiment of the present invention for decoding the RLE bit stream to obtain a desired number of AC coefficient values for a motion DCT block.

With reference to FIG. 6A, a flow diagram of the motion DCT block RLE decoding subprocess 330 according to one embodiment of the present invention is shown. Process 330 calls for decoding the RLE bit stream to obtain a desired number of AC coefficient values for a motion DCT block. Process 330 is a process for unpacking RLE data from the DV encoded bit stream.

In the standard DV format, a motion 8×8 video sample block is typically encoded by performing two 8×4 DCTs; one on a sum of interleaved lines from separate fields of a video frame and one on a difference between interleaved lines from the separate fields of the DV video frame. The DV format DCT based encoding process for the motion type 8×8 video sample block typically yields a sum zigzag based 8×4 DCT block and a difference zigzag based 8×4 DCT block.

Step 602 reads enough of the RLE bit stream for the current motion DCT block to ensure that a complete RLE code is received. Step 602 may read the RLE code for a single current DCT block or may read the RLE code for more than one DCT block. Step 604 decodes the current RLE code in the stream to obtain AC coefficient values. Step 604 processes the AC spatial frequency patterns in a zigzag scanning order. Step 606 stores the AC coefficient values. Step 608 determines whether the end of block code (EOB code) is received.

If the EOB code is received, process 330 proceeds to step 614 to zero all AC coefficient values not yet decoded for the current DCT block. If the EOB code is not received, process 330 proceeds to step 610 to determine whether a DCT bit allocation from pass one of decoding is exceeded. If the DCT bit allocation from pass one of decoding is exceeded, process 330 proceeds to step 614 to zero all AC coefficient values not yet decoded for the current DCT block. If the DCT bit allocation from pass one of decoding is not exceeded, process 330 proceeds to step 612.

Step 612 determines whether a maximum number of AC coefficient values has been obtained for the current motion DCT block. The maximum number of AC coefficient values for each motion DCT block may be set by a desired quality flag received in the ICM call from the ICM 262 of FIG. 2C. The maximum number of AC coefficient values for each motion DCT block may be varied to achieve video images of varying resolution. In an embodiment of the present invention, the maximum number of AC coefficient values for a motion DCT block may be between 5 and 31. If the maximum number of AC coefficient values has been obtained, process 330 proceeds to step 614 to zero all AC coefficient values not yet decoded for the current motion DCT block. If the maximum number of AC coefficient values has not been obtained, process 330 proceeds back to step 602 to read an RLE bit stream for a next motion DCT block. Step 614 zeroes all AC coefficient values not yet decoded for the current motion DCT block.

Step 616 builds two 4×2 DCT blocks using the DC coefficient and the desired number of AC coefficient values. As stated above, a motion 8×8 video sample block is typically encoded in the DV format by performing two 8×4 DCTs; one on the sum of interleaved lines from separate fields and one on a difference between interleaved lines from the separate fields. The DV format DCT based encoding process for the motion type 8×8 video sample block yields a sum zigzag based 8×4 DCT block and a difference zigzag based 8×4 DCT block.

Figure 6B:
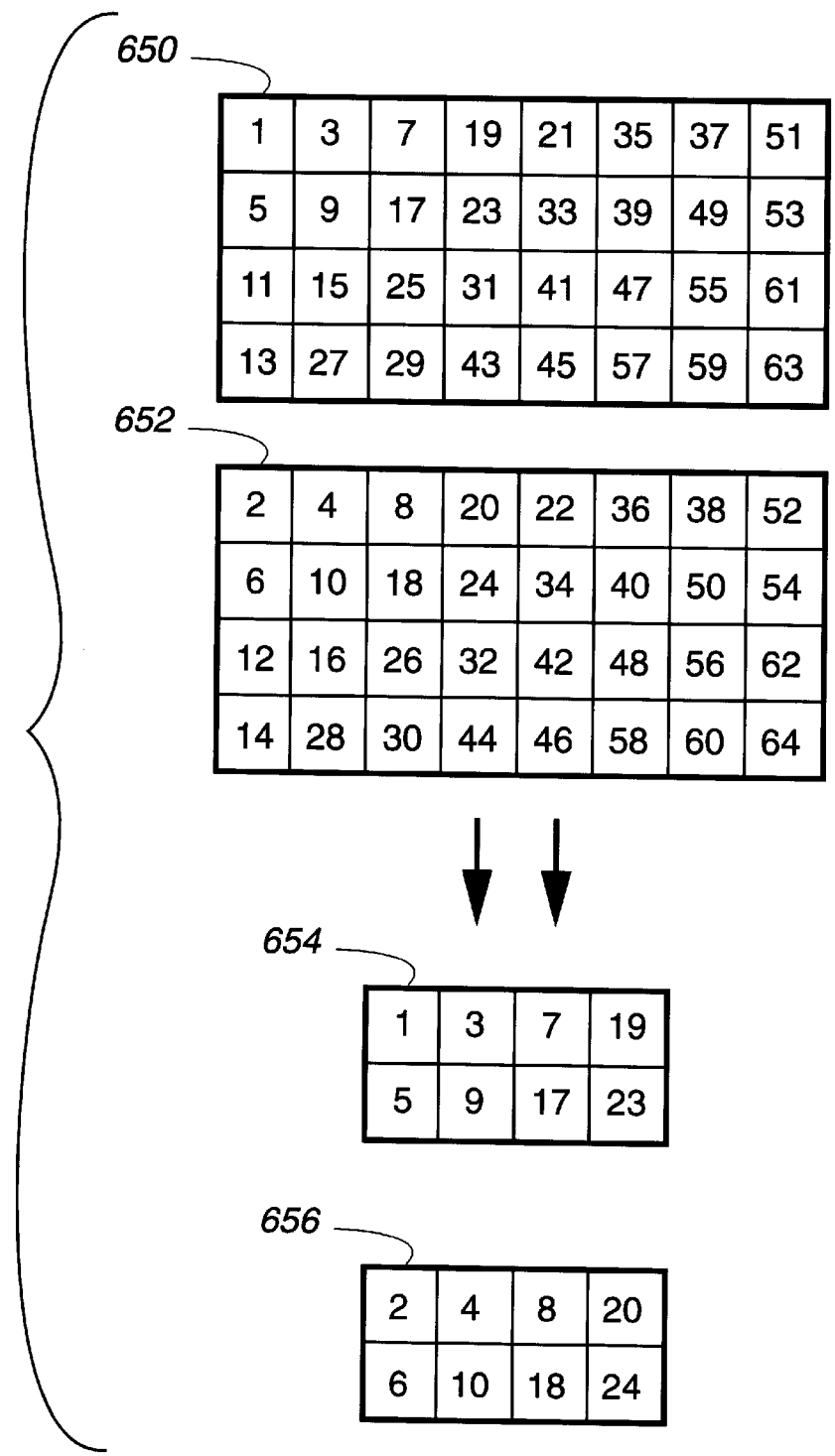
FIG. 6B is a diagram representing results of the motion DCT block RLE decoding process applied to a pair of 8×4 motion DCT blocks.

Refer to FIG. 6B which shows a diagram representing exemplary input and output parameters of the motion DCT block RLE decoding process 330 of FIG. 6A. The motion DCT block RLE decoding process 330 receives a sum 8×4 DCT block 650 and a difference 8×4 DCT block 652. The motion DCT block RLE decoding process 330 of FIG. 6A derives two 4×2 motion DCT blocks 654, 656 from the low frequency AC spatial frequency patterns of the sum 8×4 DCT block 650 and the difference 8×4 DCT block 652. The procedure used for obtaining the two 4×2 motion DCT blocks 654, 656 from the low frequency AC spatial frequency patterns of the sum 8×4 DCT block 650 and the difference 8×4 DCT block 652 is described in section 4.4.2 of "Discrete Cosine Transform Algorithms, Advantages, Applications", Academic Press Inc., 1996, by Rao and Yip. Each of the AC spatial frequency patterns has an order value indicated in FIG. 6B.

With reference back to FIG. 3A, different IDCT operations are performed on the current DCT block by steps 315 or 332 of the DV codec process 300 depending on whether the current DCT block is a still DCT block or a motion DCT block. An IDCT is a separable operation. For example, an IDCT may be performed on a 4×4 DCT block in a piecewise manner. First, a horizontal series of four 4×1 IDCTs may be performed on each of four rows to create an intermediate 4×4 matrix of values. Then, a vertical series of four 1×4 IDCTs may be performed on each of four columns of the intermediate 4×4 matrix of values to yield a 4×4 pixel component grid.

Figure 7:
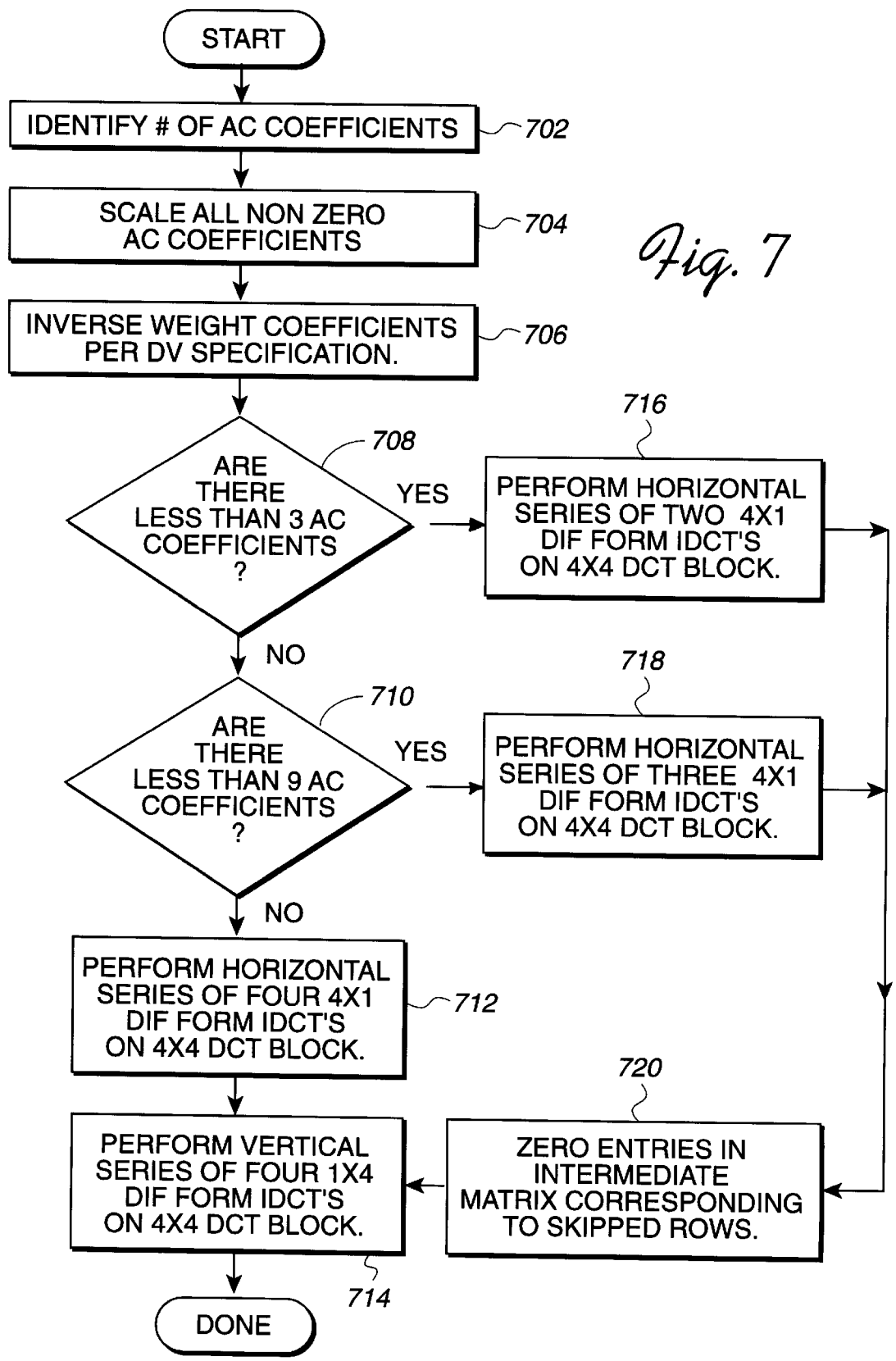
FIG. 7 is a flow diagram of a process according to one embodiment of the present invention for performing a reduced coefficient IDCT on a 4×4 still type DCT block.

With reference to FIG. 7, a flow diagram of the reduced instruction IDCT subprocess 315 according to one embodiment of the present invention is shown. Process 315 is performed on the 4×4 reduced coefficient DCT block 522 of FIG. 5B. Process 315 performs the IDCT on the still 4×4 DCT block 522 using reduced processing steps thereby reducing the processing time necessary to perform the IDCT. Process 315 takes advantage of AC coefficient values having a value of zero.

With reference back to FIG. 5B, the 4×4 reduced coefficient DCT block 522 includes 15 AC spatial frequency patterns which are scanned in the zigzag scanning order 524. If the AC coefficient value for a current AC spatial frequency pattern is equal to zero, then the AC coefficient values for each of the AC spatial frequency patterns following the current AC spatial frequency pattern, in the zigzag scanning order 524, are also equal to zero.

With reference to FIG. 7, step 702 identifies a number of non zero AC coefficient values in the 4×4 reduced coefficient DCT block 522 of FIG. 5B. Step 704 scales all non zero AC coefficient values. In step 704, each non zero AC coefficient value is multiplied by a scaling factor. In an embodiment of the present invention, the scaling factor may be approximately equal to 0.11. Step 706 inverts each weighting coefficient according to the DV specification. Step 708 determines whether there are less than 3 non zero AC coefficient values in the current still DCT block.

If there are less than 3 non zero AC coefficient values, it is assumed that each AC coefficient value for the bottom two rows of AC spatial frequency patterns is zero. In this case, process 315 proceeds to step 716 which performs a horizontal series of two 4×1 IDCTs on the current 4×4 DCT block. In an embodiment of the present invention, the IDCTs performed in step 716 may be decimation in frequency (DIF) form IDCTs. Step 720 zeroes entries in an intermediate matrix corresponding to skipped rows. If there are 3 or more non zero AC coefficient values in the 4×4 reduced coefficient DCT block 522 of FIG. 5B, process 315 proceeds from step 708 to step 710 which determines whether there are less than 9 non zero AC coefficient values in the 4×4 reduced coefficient DCT block 522.

If there are less than 9 non zero AC coefficient values it is assumed that each AC coefficient value for the bottom row of AC spatial frequency patterns is zero. In this case, process 315 proceeds to step 718. Step 718 performs a horizontal series of three 4×1 IDCTs on the current 4×4 DCT block. In an embodiment of the present invention, the IDCTs performed in step 718 may be DIF form IDCTs. Step 720 zeroes entries in an intermediate matrix corresponding to skipped rows. If there are 9 or more AC coefficient values, process 315 proceeds to step 712 which performs a horizontal series of four 4×1 IDCTs on the current 4×4 DCT block. In an embodiment of the present invention, the IDCTs performed in step 712 may be DIF form IDCTs. Step 714 performs a vertical series of four 1×4 IDCTs on the current 4×4 DCT block. In an embodiment of the present invention, the IDCTs performed in step 714 may be DIF form IDCTs.

By anticipating AC coefficients having zero values and not processing those AC coefficients, the reduced instruction IDCT subprocess 315 requires the processing of a reduced number of instructions. Process 315 can therefore be executed quickly over a processor with less taxing of the processor.

Figure 8:
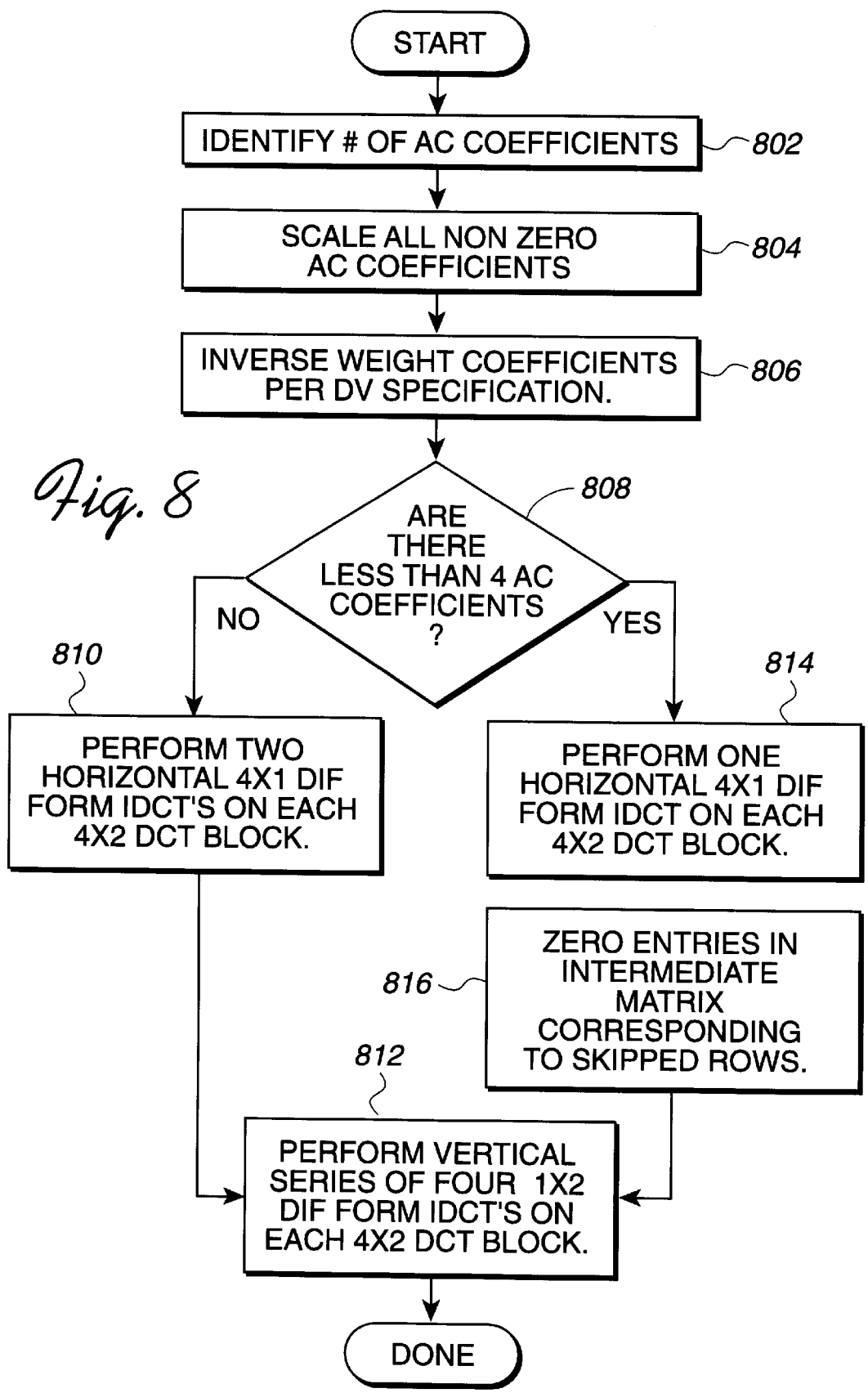
FIG. 8 is a flow diagram of a process according to one embodiment of the present invention for performing a reduced coefficient IDCT on a pair of 4×2 motion type DCT blocks.

With reference to FIG. 8, a flow diagram of the subprocess 332 according to one embodiment of the present invention is shown. Process 332 performs a reduced coefficient IDCT on AC coefficient values for a motion DCT block. Step 802 identifies a number of AC coefficient values to be used for an inverse transform operation. In an embodiment of the present invention, the number of AC coefficient values to be used can be received via a call from the ICM 262 of FIG. 2C. Step 804 scales all non zero AC coefficient values of the current motion DCT block. In step 804, each non zero AC coefficient value is multiplied by a scaling factor. In an embodiment of the present invention, this scaling factor may be approximately equal to 0.11. Step 806 inverts each weighting coefficient according to the DV specification. Step 808 determines whether there are less than 4 AC coefficient values. If there are less than 4 AC coefficient values, process 332 proceeds to step 814 which performs a horizontal 4×1 IDCT on each 4×2 DCT block. In an embodiment of the present invention, the IDCTs performed in step 814 may be DIF form IDCTs. Step 816 zeroes entries in an intermediate matrix corresponding to skipped rows. If there are 4 or more AC coefficient values, process 332 proceeds to step 810 which performs two horizontal 4×1 IDCTs on each 4×2 DCT block. Step 812 performs a vertical series of four 1×2 IDCTs on each 4×2 DCT block. In an embodiment of the present invention, the IDCTs performed in step 812 may be DIF form IDCTs.

By anticipating AC coefficients having zero values and not processing those AC coefficients, process 332 performs a reduced coefficient IDCT, which requires the processing of a reduced number of instructions. Process 332 can therefore be executed quickly over a processor with less taxing of the processor.

A reduced-quality resolution DV codec, according to aspects of the present invention, provides real time decoding of DV encoded video data with a resolution that is considerably better than that of a DC preview. The present invention provides these real time decoded high resolution images while minimizing the number of instructions which must be executed over a host processor implementing the present invention. A reduced-quality resolution DV codec of the present invention provides real time decoded video images while taxing a host processor much less than a typical full resolution DV codec taxes the host processor. As described above, the process of the present invention provides these advantages by minimizing the number of processor instructions required for performance of each IDCT and by minimizing the number of AC coefficients used to decode each DCT block.

In different embodiments of the present invention, a reduced-quality resolution DV codec may produce a variety of resultant image sizes. For example, in one embodiment using DV-NTSC format, a one-quarter image size (360×240 pixels) is produced. In another embodiment using DV-NTSC format, a full-size image of 720×480 pixels is produced using a modified form of the IDCT.

For example, a full-size image producing codec according to an aspect of the present invention yields an 8×8 block of pixels by performing a reduced instruction IDCT on a 4×4 DCT block. Normally, an 8×1 IDCT is used to produce an 8×1 row of pixels. If the last four AC coefficient values are approximately equal to zero, a standard 8×1 IDCT can be modified to eliminate the execution of math processing instructions on the AC coefficient values which are equal to zero. Furthermore, a similar reduction can be performed for less than four non-zero values using a similar technique. During decoding, a scan detects how many non-zero values there are and the appropriate algorithm may then be used.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a digital computer, a digital video codec process comprising the computer-implemented steps of:

receiving a digital video encoded bit stream, said digital video encoded bit stream including a plurality of discrete cosine transform (DCT) blocks;

reading information including a DC coefficient value for a current DCT block of said digital video encoded bit stream;

determining whether said current DCT block represents a still DCT block or a motion DCT block;

wherein if said current DCT block is a still DCT block, executing the steps of performing run length decoding to obtain a plurality N of low frequency AC coefficient values for said current DCT block wherein N is less than the total number of AC coefficient values in said current DCT block wherein N is an integer, building a reduced size still DCT block using said DC coefficient value and said N low frequency AC coefficient values, and performing a reduced coefficient inverse discrete cosine transform on said reduced size still DCT block to yield a first set of decoded pixel values; and wherein if said current DCT block is a motion DCT block, executing the steps of performing run length decoding to obtain a plurality M of low frequency AC coefficient values for said current DCT block wherein M is less than the total number of AC coefficient values in said current DCT block wherein M is an integer and M is not equal to N, building a reduced size motion DCT block using said DC coefficient value and said M low frequency AC coefficient values, and performing a reduced coefficient inverse discrete cosine transform on said reduced size motion DCT block to yield a second set of decoded pixel values.

2. A digital video codec process as in claim 1 wherein said plurality N is equal to 15 and said reduced size still DCT block is a zigzag based 4×4 still DCT block.

3. A digital video codec process as in claim 2 wherein said step of performing a reduced coefficient inverse discrete cosine transform on said zigzag based 4×4 still DCT block is performed by the sub-steps of:

determining whether there are less than 3 non zero AC coefficient values in said 4×4 still DCT block;

wherein if there are less than 3 non zero AC coefficient values in said 4×4 still DCT block, performing a horizontal series of two 4×1 inverse discrete cosine transforms on said current 4×4 still DCT block, and zeroing entries in an intermediate matrix corresponding to skipped rows;

wherein if there are 3 or more non zero AC coefficient values in said 4×4 still DCT block, determining whether there are less than 9 non zero AC coefficient values in said 4×4 still DCT block, wherein if there are less than 9 non zero AC coefficient values in said 4×4 still DCT block, performing a horizontal series of three 4×1 inverse discrete cosine transforms on said 4×4 still DCT block and zeroing entries in an intermediate matrix corresponding to skipped rows, wherein if there are 9 or more non zero AC coefficient values in said 4×4 still DCT block, performing a horizontal series of four 4×1 inverse discrete cosine transforms on said current 4×4 still DCT block; and performing a vertical series of four 1×4 inverse discrete cosine transforms on said 4×4 still DCT block.

4. A digital video codec process as in claim 3 wherein each of said inverse discrete cosine transforms is a decimation in frequency form inverse discrete cosine transform.

5. A digital video codec process as in claim 1 wherein said plurality N is equal to 3 and said reduced size still DCT block is a zigzag based 2×2 still DCT block.

6. A digital video codec process as in claim 1 wherein said reduced size motion DCT block includes a 4×2 sum motion DCT block and a 4×2 difference motion DCT block.

7. A digital video codec process as in claim 6 wherein said step of performing a reduced coefficient inverse discrete cosine transform on said 4×2 sum motion DCT block and said 4×2 difference motion DCT block includes the sub-steps of:

determining whether there are less than 5 non zero AC coefficient values in said pair of 4×2 DCT blocks;

wherein if there are less than 5 non zero AC coefficient values, performing a horizontal 4×1 inverse discrete cosine transform on each 4×2 DCT block and zeroing entries in an intermediate matrix corresponding to skipped rows;

wherein if there are 5 or more non zero AC coefficient values in said pair of 4×2 DCT blocks, performing two horizontal 4×1 inverse discrete cosine transforms on each 4×2 DCT block; and performing a vertical series of four 1×2 inverse discrete cosine transforms on each 4×2 DCT block.

8. A digital video codec process as in claim 7 wherein each of said inverse discrete cosine transforms is a decimation in frequency form inverse discrete cosine transform.

9. A digital video codec process as in claim 1 wherein said step of reading information comprises the sub-steps of:

reading descriptors for said current DCT block, said descriptors including a quantization code, a motion block flag, a class code, and a DC coefficient value;

determining whether a sequential flag is set for a current video frame; and wherein if said sequential flag is set, executing the steps of determining whether said descriptors of said current DCT block are within tolerance of descriptors of a corresponding DCT block in a previous decoded frame, and wherein if said descriptors of said current DCT block are within tolerance, using said corresponding DCT block from said previous decoded frame in place of said current DCT block and returning said digital video codec process.

10. A computer-readable medium for implementing a digital video codec process comprises computer-readable instructions for:

receiving a digital video encoded bit stream, said digital video encoded bit stream including a plurality of discrete cosine transform (DCT) blocks;

reading information including a DC coefficient value for a current DCT block of said digital video encoded bit stream;

determining whether said current DCT block represents a still DCT block or a motion DCT block;

wherein if said current DCT block is a still DCT block, executing the steps of performing run length decoding to obtain a plurality N of low frequency AC coefficient values for said current DCT block wherein N is less than the total number of AC coefficient values in said current DCT block wherein N is an integer, building a reduced size still DCT block using said DC coefficient value and said N low frequency AC coefficient values, and performing a reduced coefficient inverse discrete cosine transform on said reduced size still DCT block to yield a first set of decoded pixel values; and wherein if said current DCT block is a motion DCT block, executing the steps of performing run length decoding to obtain a plurality M of low frequency AC coefficient values for said current DCT block wherein M is less than the total number of AC coefficient values in said current DCT block wherein M is an integer and M is not equal to N, building a reduced size motion DCT block using said DC coefficient value and said M low frequency AC coefficient values, and performing a reduced coefficient inverse discrete cosine transform on said reduced size motion DCT block to yield a second set of decoded pixel values.

11. In a digital computer, a digital video codec apparatus comprising:

means for receiving a digital video encoded bit stream, said digital video encoded bit stream including a plurality of discrete cosine transform (DCT) blocks;

means for reading information including a DC coefficient value for a current DCT block of said digital video encoded bit stream;

means for determining whether said current DCT block represents a still DCT block or a motion DCT block;

means for performing run length decoding to obtain a plurality N or M of low frequency AC coefficient values for said current DCT block wherein N and M are integers and different from one another, and are less than the total number of AC coefficient values in said current DCT block;

means for building a reduced size still or motion DCT block using said DC coefficient value and said respective N or M low frequency AC coefficient values; and means for performing a reduced coefficient inverse discrete cosine transform on said reduced size still or motion DCT block to yield a first set of decoded pixel values.

12. A digital video codec apparatus as in claim 11 wherein said plurality N is equal to 15 and said reduced size still DCT block is a zigzag based 4×4 still DCT block.

13. A digital video codec apparatus as in claim 12 wherein said means for performing a reduced coefficient inverse discrete cosine transform on said zigzag based 4×4 still DCT block includes:

means for determining whether there are less than 3 non zero AC coefficient values in said 4×4 still DCT block;

means for performing a horizontal series of two 4×1 inverse discrete cosine transforms on said current 4×4 still DCT block, and zeroing entries in an intermediate matrix corresponding to skipped rows;

means for determining whether there are less than 9 non zero AC coefficient values in said 4×4 still DCT block, means for performing a horizontal series of three 4×1 inverse discrete cosine transforms on said 4×4 still DCT block and zeroing entries in an intermediate matrix corresponding to skipped rows;

means for performing a horizontal series of four 4×1 inverse discrete cosine transforms on said current 4×4 still DCT block; and means for performing a vertical series of four 1×4 inverse discrete cosine transforms on said 4×4 still DCT block.

14. A digital video codec apparatus as in claim 13 wherein each of said inverse discrete cosine transforms is a decimation in frequency form inverse discrete cosine transform.

15. A digital video codec apparatus as in claim 11 wherein said plurality N is equal to 3 and said reduced size still DCT block is a zigzag based 2×2 still DCT block.

16. A digital video codec apparatus as in claim 11 wherein said reduced size motion DCT block includes a 4×2 sum motion DCT block and a 4×2 difference motion DCT block.

17. A digital video codec apparatus as in claim 16 wherein said means for performing a reduced coefficient inverse discrete cosine transform on said 4×2 sum motion DCT block and said 4×2 difference motion DCT block includes:

means for determining whether there are less than 5 non zero AC coefficient values in said pair of 4×2 DCT blocks;

means for performing a horizontal 4×1 inverse discrete cosine transform on each 4×2 DCT block and zeroing entries in an intermediate matrix corresponding to skipped rows;

means for performing two horizontal 4×1 inverse discrete cosine transforms on each 4×2 DCT block; and means for performing a vertical series of four 1×2 inverse discrete cosine transforms on each 4×2 DCT block.

18. A digital video codec apparatus as in claim 17 wherein each of said inverse discrete cosine transforms is a decimation in frequency form inverse discrete cosine transform.

19. A digital video codec apparatus as in claim 11 wherein said means for reading information includes:

means for reading descriptors for said current DCT block, said descriptors including a quantization code, a motion block flag, a class code, and a DC coefficient value;

means for determining whether a sequential flag is set for a current video frame;

means for determining whether said descriptors of said current DCT block are within tolerance of descriptors of a corresponding DCT block in a previous decoded frame; and means for using said corresponding DCT block from said previous decoded frame in place of said current DCT block and returning said digital video codec process.

* * * * *